(12) United States Patent
Korzh

(10) Patent No.: US 10,691,593 B1
(45) Date of Patent: Jun. 23, 2020

(54) PREDICTIVE DATA STORAGE HIERARCHICAL MEMORY SYSTEMS AND METHODS

(71) Applicant: Micron Technology, Inc., Boise, ID (US)

(72) Inventor: Anton Korzh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/226,244

(22) Filed: Dec. 19, 2018

(51) Int. Cl.
    *G06F 12/10* (2016.01)
    *G06F 12/0802* (2016.01)
    *G06N 20/00* (2019.01)
    *G06F 3/06* (2006.01)

(52) U.S. Cl.
    CPC ........ *G06F 12/0802* (2013.01); *G06F 3/0626* (2013.01); *G06F 3/0638* (2013.01); *G06F 3/0688* (2013.01); *G06N 20/00* (2019.01)

(58) Field of Classification Search
    CPC ........................... G06F 12/0802; G06F 3/0688
    USPC ........................................................ 711/118
    See application file for complete search history.

(56) References Cited

U.S. PATENT DOCUMENTS

2011/0238923 A1* 9/2011 Hooker ............... G06F 12/0862
                                                          711/137

* cited by examiner

*Primary Examiner* — Jae U Yu
(74) *Attorney, Agent, or Firm* — Fletcher Yoder, P.C.

(57) ABSTRACT

Techniques for implementing an apparatus, which includes a memory system that provides data storage via multiple hierarchical memory levels, are provided. The memory system includes a cache that implements a first memory level and a memory array that implements a second memory level higher than the first memory level. Additionally, the memory system includes one or more memory controllers that determine a predicted data access pattern expected to occur during an upcoming control horizon, based at least in part on first context of first data to be stored in the memory sub-system, second context of second data previously stored in the memory system, or both, and control what one or more memory levels of the multiple hierarchical memory levels implemented in the memory system in which to store the first data, the second data, or both based at least in part on the predicted data access pattern.

29 Claims, 9 Drawing Sheets

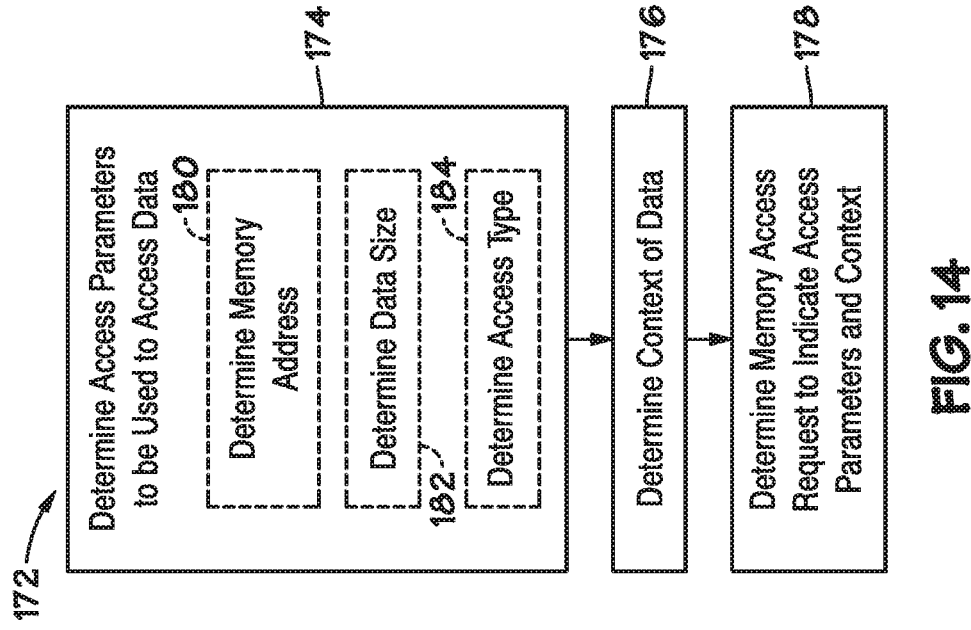
FIG. 14
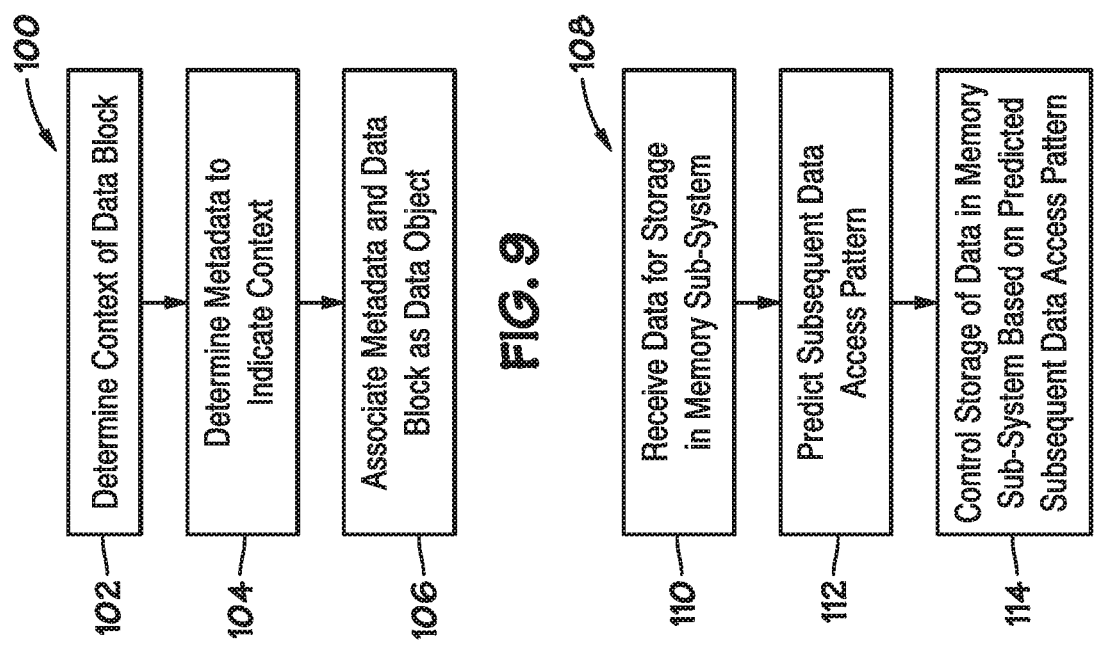
FIG. 9
FIG. 10

PREDICTIVE DATA STORAGE HIERARCHICAL MEMORY SYSTEMS AND METHODS

BACKGROUND

The present disclosure generally relates to memory systems (e.g., sub-systems) and, more particularly, to predictively controlling (e.g., adjusting) data storage across multiple hierarchical memory levels (e.g., layers) implemented in a memory system.

Generally, a computing system includes a processing sub-system and a memory sub-system, which may store data accessible to processing circuitry of the processing sub-system. For example, to perform an operation, the processing circuitry may execute corresponding instructions retrieved from a memory device implemented in the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which:

FIG. 9 is a flow diagram of an example process for generating a data object, in accordance with an embodiment of the present disclosure;

FIG. 10 is a flow diagram of an example process for operating the memory-subsystem of FIG. 1 to store received data, in accordance with an embodiment of the present disclosure;

FIG. 14 is a flow diagram of an example process for generating a memory access request, in accordance with an embodiment of the present disclosure;

DETAILED DESCRIPTION

Figure 1:
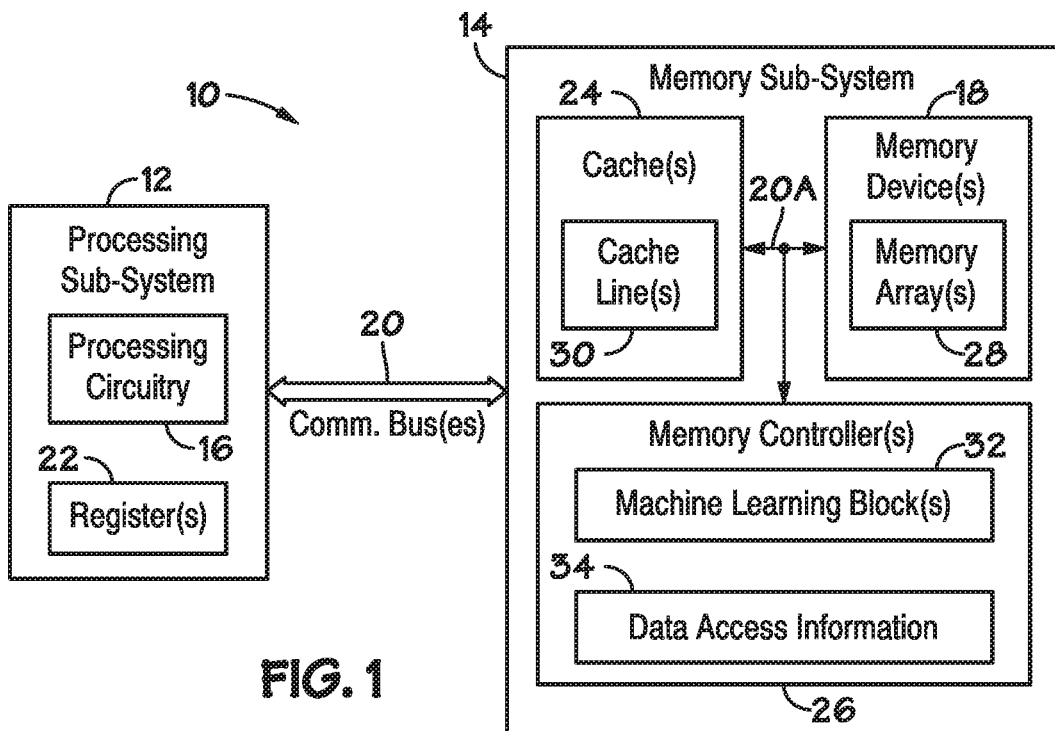
FIG. 1 is a block diagram of a computing system that includes a processing sub-system and a memory sub-system, in accordance with an embodiment of the present disclosure.

The present disclosure provides techniques that facilitate improving operational efficiency of computing systems, for example, by mitigating architectural features that may otherwise limit operational efficiency. Generally, a computing system may include various sub-systems, such as a processing sub-system and/or a memory sub-system. In particular, the processing sub-system may include processing circuitry, for example, implemented using one or more processors and/or one or more processor cores. The memory sub-system may include one or more memory device (e.g., chips or integrated circuits), for example, implemented on a memory module, such as a dual in-line memory module (DIMM).

Generally, during operation of a computing system, processing circuitry implemented in its processing sub-system may perform various operations by executing corresponding instructions, for example, to determine output data by performing a data processing operation on input data. In some instances, a processing sub-system may include one or more registers, which provide storage locations directly accessible by its processing circuitry. However, storage capacity of registers is generally limited.

As such, a memory sub-system may be communicatively coupled to the processing sub-system to provide the processing sub-system additional storage locations, for example, via a memory array implemented in one or more memory devices. In other words, continuing with the above example, the memory sub-system may store the data input to the data processing operation, the data output (e.g., resulting) from the data processing operation, data indicating the executable instructions, or any combination thereof. As such, during operation of the computing system, the processing sub-system may access the memory sub-system, for example, to store (e.g., write) data to the memory sub-system and/or to retrieve (e.g., read) data previously stored in the memory sub-system.

To access the memory sub-system, the processing sub-system may output one or more memory access requests, which indicate access parameters to be used by the memory sub-system. For example, to store (e.g., write) a data block to the memory sub-system, the processing sub-system may output a write memory access request that indicates one or more write access parameters, such as a virtual memory address used by processing circuitry to identify the data block, a physical memory address in the memory sub-system at which the data block is to be stored, size (e.g., bit depth) of the data block, and/or a write enable indicator (e.g., bit). Additionally or alternatively, to retrieve (e.g., read) a data block from the memory sub-system, the processing sub-system may output a read memory access request that indicates read access parameters, such as a virtual memory address used by processing circuitry to identify the target data block, a physical memory address in the memory sub-system at which the data block is expected to be stored, size (e.g., bit depth) of the data block, and/or a read enable indicator (e.g., bit).

In response to receipt of a read memory access request, the memory sub-system may search for a data block targeted by the read memory access request based at least in part on the read access parameters indicated in the read memory access request. For example, the memory sub-system may determine a target tag value (e.g., block identifier metadata) expected to be associated with the target data block based at least in part on a virtual memory address and/or a physical memory address indicated in the read memory access request. Additionally, the memory sub-system may identify (e.g., find) the target data block by successively searching tag values associated with valid data block stored therein against the target tag value. Once a match is detected, the memory sub-system may identify an associated data block as the target data block and, thus, return the associated data block to the processing sub-system, for example, for processing and/or execution by its processing circuitry. Accordingly, at least in some instances, operational efficiency of a computing system may be dependent on data retrieval latency (e.g., duration before target data is returned) provided by its memory sub-system.

To facilitate improving (e.g., reducing or shortening) data retrieval latency, in some instances, total storage capacity of a memory sub-system may be distributed across multiple hierarchical memory levels (e.g., layers). Generally, a hierarchical memory sub-system may include a lowest (e.g., first) memory level closest to the processing circuitry and a highest (e.g., last) memory level farthest from the processing circuitry. Additionally, in some instances, the hierarchical memory sub-system may include one or more intermediate memory levels between the lowest memory level and the highest memory level. In other words, an intermediate memory level may be implemented farther from the processing circuitry compared to the lowest memory level and closer to the processing circuitry compared to the highest memory level.

Generally, when data is targeted (e.g., requested), a hierarchical memory sub-system may attempt to retrieve the target data from the lowest hierarchical before successively progressing to higher memory levels if the target data results in a miss (e.g., target tag value does not match any valid tag values). For example, the memory sub-system may check whether the target data block is currently stored in the lowest (e.g., first) memory level. When the target data block results in a miss in the lowest memory level, the memory sub-system may then check whether the target data block is currently stored in the next lowest (e.g., second) memory level, and so on.

Thus, to facilitate improving data retrieval latency, a hierarchical memory sub-system may be implemented such that a lower memory level generally provides faster (e.g., shorter) data retrieval latency compared to a higher memory level. However, data retrieval latency provided by a memory level may generally be dependent on its storage capacity, for example, since increasing storage capacity may enable an increase in the number of valid data blocks stored therein and, thus, potentially increase the amount of searching performed before a target data block is identified and returned. As such, to facilitate providing the faster data retrieval latency, the lower memory level may be implemented with less (e.g., smaller) storage capacity compared to the higher memory level.

However, implementing a lower memory level with less storage capacity may limit the total storage capacity provided by a memory sub-system. As such, to facilitate maintaining or even increasing total storage capacity provided by the memory sub-system, a higher memory level may be implemented with more (e.g., larger) storage capacity compared to a lower memory level. In other words, a memory sub-system may be implemented with multiple hierarchical memory levels to facilitate balancing tradeoffs between average data retrieval latency (e.g., operational efficiency) and total storage capacity provided.

To facilitate achieving the balance, in some instances, a memory sub-system may be implemented with multiple different memory types, which provide varying tradeoffs that affect operational efficiency and/or implementation associated cost. For example, volatile memory, such as dynamic random-access memory (DRAM) or static random-access memory (SRAM), may provide faster data transfer (e.g., read and/or write) speeds compared to non-volatile memory. Thus, to facilitate providing the faster data retrieval latency, in some instances, a lower memory level may be implemented using volatile memory. For example, the lower memory level may be implemented using one or more DRAM modules communicatively coupled to the processing circuitry via a memory (e.g., external) bus.

On the other hand, non-volatile memory, such as flash (e.g., NAND) memory, phase-change memory (e.g., 3D XPoint™) memory, or ferroelectric random access memory (FeRAM), may provide higher (e.g., greater) data storage density compared to volatile memory. Additionally, non-volatile memory cells, in contrast to volatile memory cells, may maintain their stored value or data bits even while in an unpowered state. Thus, in some instances, a higher memory level may be implemented using non-volatile memory to facilitate reducing implementation associated cost, for example, by enabling the memory sub-system to be implemented with increased total storage capacity, reduced physical footprint (e.g., size), and/or persistence in the absence of a constant power supply. For example, the higher memory level may be implemented using one or more non-volatile memory (e.g., hard disk or solid state) drives communicatively coupled to the processing circuitry via the memory (e.g., external) bus.

However, at least in some instances, data communication via the memory bus is generally slower than data communication via an internal bus, for example, due to timing differences between components on a processor-side of the memory bus and components on a memory-side of the memory bus, the memory bus being shared with other computing sub-systems, and/or communication distance along the memory bus. In other words, data communication within (e.g., internal to) the processor-side components may be faster than data communication between the processor-side components and the memory-side components via the memory bus.

Thus, to facilitate improving data retrieval latency, in some instances, the memory sub-system may include one or more caches implemented on a processor-side of the memory bus. For example, the memory sub-system may include an L1 cache, an L2 cache, and/or an L3 cache integrated with processing circuitry of the processing sub-system. In other words, in such instances, a first (e.g., memory-side) portion of the memory sub-system may be implemented on the memory-side of the memory bus while a second (e.g., processor-side) portion of the memory sub-system is implemented on the processor-side of the memory bus.

Moreover, in such instances, the processor-side of the memory sub-system may be implemented to provide one or more lower memory levels compared to the memory-side of the memory sub-system. In other words, a processor-side (e.g., L1, L2, or L3) cache may be implemented as a lower memory level compared to a memory level implemented by a memory device on the memory-side of the memory sub-system. Thus, at least in some instances, one or more processor-side caches may be implemented using static random-access memory (SRAM), for example, while the memory-side memory device is implemented using dynamic random-access memory (DRAM).

Moreover, before retrieving target data from the memory-side of the memory sub-system, the computing system may attempt to retrieve the target data from the processor-side of the memory sub-system. In other words, when currently stored in a processor-side cache, the memory sub-system may provide (e.g., output) a cache line that includes an instance (e.g., copy) of the target data to the processing circuitry, for example, instead of from a memory-side memory device that also stores the target data block. As described above, at least in some instances, providing target data to processing circuitry from a processor-side cache may facilitate improving (e.g., reducing) data retrieval latency and, thus, operational efficiency of the computing system, for example, by obviating communication via the memory bus and/or due to faster memory being implemented in the processor-side cache compared to the memory-side memory device.

However, when target data is not currently stored in the processor-side of the memory sub-system, the computing system may retrieve the target data from the memory-side of the memory sub-system. Moreover, in some instances, the computing system may store a copy (e.g., instance) of the target data into one or more lower memory levels, such as a cache memory level, after retrieval from the memory-side of the memory sub-system, for example, to facilitate reducing data retrieval latency if the target data is subsequently targeted (e.g., requested) again. Thus, at least in some instances, a processor-side miss may actually result in slower (e.g., higher) data retrieval latency compared to directly retrieving the target data from the memory-side of the memory sub-system. In other words, the effect on operational efficiency resulting from implementing a memory sub-system with multiple hierarchical memory levels may largely be dependent on memory level in which data is stored at when the data is actually targeted.

As such, to facilitate improving computing system operational efficiency, the present disclosure provides techniques for implementing and/or operating a memory sub-system to predictively control (e.g., adjust) storage location of data, for example, such that data is stored at an optimal memory level when actually targeted (e.g., requested). To facilitate controlling data storage, in some embodiments, the memory sub-system may include one or more memory controllers (e.g., control circuitry). For example, when implemented on a processor-side of a memory bus and a memory-side of the memory bus, the memory sub-system may include a first (e.g., memory-side) memory controller implemented to control data storage on the memory-side of the memory sub-system and a second (e.g., processor-side) memory controller implemented to control data storage on the processor-side of the memory sub-system.

Additionally or alternatively, the memory sub-system may include a memory controller implemented to control data storage in the processor-side of the memory sub-system, data storage in the memory-side of the memory sub-system, or both. In other words, as used herein, a "memory controller" is intended to describe a controller that controls operation (e.g., data storage) in a memory system (e.g., sub-system). In fact, in some embodiments, a memory controller may be implemented using multiple controllers, such as a cache controller that controls data storage in cache memory levels and a DRAM memory controller that controls data storage in DRAM memory levels.

To facilitate predictively controlling data storage, in some embodiments, a memory controller may predict a data access pattern expected to subsequently occur and control (e.g., adjust) data storage in the memory sub-system according. For example, the memory controller may determine the predicted data access pattern by predicting what data processing circuitry will subsequently target (e.g., request) and/or when the processing circuitry will subsequently target the data. Although seemingly random, data access patterns of processing circuitry are often somewhat cyclical.

As such, in some embodiments, a memory controller may determine a predicted data access pattern expected to occur during an upcoming (e.g., subsequent) control horizon (e.g., time period or one or more clock cycles) based at least in part on one or more previous data access patterns. To facilitate predicting the subsequent data access pattern, the memory controller may include a machine learning block (e.g., circuitry or module) that implements machine learning techniques. For example, the machine learning block may be a neural network block that implements neural network techniques.

In some embodiments, a machine learning block may receive input parameters indicative of a previous data access pattern and output parameters indicative of a predicted data access pattern expected subsequently occur. For example, the input parameters may include a block identifier identifying a previously targeted data block, data access information, and/or a prediction error of a previously predicted data access pattern relative to the actual data access pattern. Additionally or alternatively, the output parameters may include a predicted next target time of data, a prediction of next target data, and/or a storage (e.g., memory level, flush, and/or replace) recommendation.

To facilitate improving subsequent data retrieval latency, in some embodiments, a memory controller may predictively control (e.g., adjust) storage of data when the data is initially received for storage in the memory sub-system, for example, by identifying a memory level at which to store the data based at least in part on a predicted data access pattern expected to occur during an upcoming control horizon. In some embodiments, the memory controller may select a memory level for storage of the data based at least in part on when the data is next expected to be targeted (e.g., requested). For example, when duration between a current time and a predicted next target time of the data block is less than a first (e.g., lowest) duration threshold, the memory controller may select a first (e.g., lowest or L1) memory level associated with the first duration threshold for storage of the data block. On the other hand, when the duration between the current time and the predicted next target time is not less than the first duration threshold, the memory controller may determine whether the duration is less than a second (e.g., next lowest) duration threshold associated with a second (e.g., next lowest or L2) memory level and select the second for storage of the data block when the duration is less than the second duration threshold. In a similar manner, the memory controller may progress through other (e.g., higher) memory levels implemented in the memory sub-system when a data block is initially received for storage.

Additionally or alternatively, a memory controller may predictively control (e.g., adjust) data storage in the memory sub-system when data previously stored in the memory sub-system is accessed (e.g., read, retrieved, and/or targeted). In particular, in some embodiments, data access information (e.g., stored in the memory controller) may be updated whenever a data block is accessed, for example, to update an access count and/or a most recent target time associated with the data block. In other words, in such embodiments, the memory controller may input the updated data access information into its machine learning block to determine a predicted data access pattern expected to occur during an upcoming control horizon and control data storage in the memory sub-system accordingly.

In some embodiments, similar to when data is initially stored in the memory sub-system, a memory controller may predictively control storage of data previously stored in the memory sub-system based at least in part on when the data is expected to be targeted next. For example, when the duration between a current time and the predicted next target time is not less than a current duration threshold associated with a current memory level, the memory sub-system may attempt to store the data at a higher memory level. On the other hand, when the duration between the current time and the predicted next target time is less than the current duration threshold and a lower duration threshold associated with a lower memory level, the memory sub-system may attempt to store the data at the lower memory level. Additionally, the memory sub-system may maintain storage of the data at the current memory level when the duration between the current time and the predicted next target time is less than the current duration threshold and the current memory level is the lowest memory level, when the duration between the current time and the predicted next target time is not less than the current duration threshold and the current memory level is the highest memory level, or when the duration between the current time and the predicted next target time is less than the current duration threshold, but not less than the lower duration threshold.

Additionally or alternatively, a memory controller may predictively control storage of data previously stored in the memory sub-system based at least in part on a prediction of what data will be targeted next. For example, the memory controller may control data storage in the memory sub-system such that a data block predicted to be targeted next is stored in a lower (e.g., lowest) memory level. As such, when subsequently actually targeted, the memory sub-system may return the data block from the lower memory level, for example, instead of from a higher memory level, which, at least in some instances, may facilitate improving data retrieval latency provided by the memory sub-system.

In any case, as described above, in some embodiments, a prediction error (e.g., difference between previously predicted data access pattern and actual data access pattern) may be input to a machine learning block. In other words, in such embodiments, the machine learning block may use the prediction error to inform (e.g., train and/or calibrate) subsequent predictions. As such, at least in some instances, prediction accuracy of a machine learning block and, thus, efficacy of predictive data storage techniques may improve over time.

To facilitate improving prediction accuracy, in some embodiments, a machine learning block may be pre-trained or pre-calibrated. For example, the memory sub-system may initialize a neural network implemented by the machine learning block with weights received from a manufacturer and/or a system integrator. Additionally or alternatively, to facilitate improving prediction accuracy, a machine learning block may predict a data access pattern expected to subsequently occur based at least in part on context of data stored or to be stored in the memory sub-system.

In some embodiments, the context of a data block may be indicated via one or more context identifiers. For example, a type identifier may indicate the type of data included in the data block. As an illustrative example, the type identifier may indicate whether the data block includes image data, virtual machine data, executable instructions, audio data, or any combination thereof. Additionally or alternatively, an association identifier may indicate an aspect of the computing system that produced the data block and/or is expected to target or use the data block. For example, a process identifier may indicate a process running in the computing system that resulted in generation of the data block and/or a process expected to target the data block when run in the computing system.

Additionally, in some embodiments, a user identifier may indicate a user of the computing system for which the data block was generated and/or a user of the computing system for which the data block is expected to be targeted. Furthermore, in some embodiments, a thread identifier may indicate a processor thread that generated the data block and/or a processor thread expected to target the data block. Moreover, in some embodiments, a core identifier may indicate a processor core that generated the data block and/or a processor core expected to target the data block. Additionally, in some embodiments, a virtual machine identifier may indicate a virtual machine that resulted in generation of the data block and/or a virtual machine expected to target the data block when run in the computing system. Furthermore, in some embodiments, an application identifier may indicate an application running in the computing system that resulted in generation of the data block and/or a process expected to target the data block when run in the computing system.

In some embodiments, a data block may be associated with its context by indicating one or more context identifiers via metadata, which is grouped (e.g., concatenated) with the data block to form a data object. In other words, the data object may include a data block and metadata that indicates one or more context identifiers indicative of context of the data block. For example, the metadata may indicate the type identifier, the process identifier, the application identifier, the user identifier, the virtual machine identifier, the thread identifier, the core identifier, a custom identifier, or any combination thereof. Furthermore, in some embodiments, the metadata may include tag metadata (e.g., block identifier) that identifies the corresponding data block. For example, the tag metadata may indicate a virtual memory address of the data block, a physical memory address of the data block, or a value determined based on the virtual memory address and the physical memory address.

To facilitate improving prediction accuracy, in some embodiments, a memory controller may input context identifiers into its machine learning block, for example, to enable the machine learning block to consider context of previous data access. As an illustrative example, an application running in the computing system may result in a first memory access request and a second memory access request. However, between the first memory access request and the second memory access request, a system interrupt may result in an intervening memory access request.

By inputting an application identifier corresponding with the application and/or a thread identifier corresponding with the system interrupt, the machine learning block may determine that the first memory access request and the second memory access request resulted from running the application while the intervening memory access request resulted from a system interrupt. As such, to determine a predicted data access pattern expected to result from running the application, the machine learning block may more heavily weight the first memory access request and the second memory access request compared to the third memory access request.

In fact, in some embodiments, a machine learning block may include multiple neural networks implemented for different purposes. For example, the machine learning block may include a neural network implemented to output an indication of a prediction of next target data and another neural network implemented to output an indication of a predicted next target time of specific data. Additionally or alternatively, the machine learning block may include neural networks geared to different aspects of the computing system For example, the machine learning block may include a neural network implemented to output an indication of a predicted data access pattern expected to result from running a first application or process running in the computing system and another neural network implemented to output an indication of a prediction data access pattern expected to result from running a second application or process running in the computing system. Additionally, in some embodiments, the machine learning block may include a neural network implemented to output an indication of a predicted data access pattern expected to result from a first processor core or thread in the computing system and another neural network implemented to output an indication of a prediction data access pattern expected to result from a second processor core or thread in the computing system.

Furthermore, in some embodiments, the machine learning block may include a neural network implemented to output an indication of a predicted data access pattern expected to result from running a first virtual machine in the computing system and another neural network implemented to output an indication of a predicted data access pattern expected to result from running a second virtual machine in the computing system. Moreover, in some embodiments, the machine learning block may include a neural network implemented to output an indication of a predicted data access pattern expected to result from a first user using the computing system and another neural network implemented to output an indication of a predicted data access pattern expected to result from a second user using the computing system. In any case, at least in some instances, inputting context into a machine learning block may facilitate improving its prediction accuracy, for example, by enabling the machine learning block to filter out noise (e.g., unrelated memory access requests), which may otherwise affect its prediction.

To facilitate identifying context, in some embodiments, one or more context identifiers may be indicated in a memory access request, for example, along with one or more access parameters. In other words, in such embodiments, the processing sub-system may output a memory access request indicating one or more context identifiers associated with a data block along with access parameters such as, a virtual memory address used by processing circuitry to identify the data block, a physical memory address used or to be used to store the data block in the memory sub-system, size of the data block, and/or an access (e.g., write or read) enable indicator (e.g., bit). For example, the processing sub-system may output a memory access request indicating one or more context identifiers to a processor-side of the memory sub-system and/or to a memory-side of the memory sub-system.

As described above, in some embodiments, a first (e.g., memory-side) portion of a memory sub-system may be implemented on a memory-side of a memory bus while a second (e.g., processor-side) portion of the memory sub-system is implemented on a processor-side of the memory bus. Additionally, as described above, in some embodiments, a first (e.g., memory-side) memory controller may control data storage in the memory-side of the memory sub-system while a second (e.g., processor-side) memory controller may control data storage in the processor-side of the memory sub-system. Thus, in some embodiments, the processor-side memory controller may communicate one or more context identifiers to the memory-side memory controller, for example, by forwarding the memory access request received from the processor sub-system via the memory bus and/or a dedicated (e.g., separate or distinct) data bus. Additionally or alternatively, the memory-side memory controller may predictively control data storage based at least in part on the context identifiers included in data objects (e.g., metadata+data blocks), for example, even when the context identifiers are not explicitly received from the processor-side.

In this manner, as will be described in more detail below, a memory sub-system may be implemented and/or operated in accordance with the present disclosure to facilitate predictively controlling data storage in the memory sub-system. For example, implementing a memory sub-system in this manner may enable the memory sub-system to better optimize the tradeoff between average data retrieval latency and storage capacity provided by multiple hierarchical memory levels. In other words, at least in some instances, implementing and/or operating a memory sub-system in this manner may facilitate improving data retrieval latency provided by the memory sub-system and, thus, operational efficiency of a computing system in which the memory sub-system is implemented.

To help illustrate, an example of a computing system 10 (e.g., apparatus), which includes a processing sub-system 12 (e.g., system) and a memory sub-system 14 (e.g., system), is shown in FIG. 1. It should be appreciated that the depicted example is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, may be implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 may be implemented in a client device.

In any case, during operation of the computing system 10, the processing sub-system 12 generally performs various operations, for example, to determine output data by executing instructions in a processor thread to perform a corresponding data processing operation on input data. Thus, as in the depicted example, the processing sub-system 12 may include processing circuitry 16. In some embodiments, the processing circuitry 16 may include one or more central processing units (CPUs), one or more graphics processing units (GPUs), one or more processor cores, or any combination thereof.

Additionally, as in the depicted example, the processing sub-system 12 may include one or more registers 22. In some embodiments, a register 22 may provide one or more storage locations directly accessible to the processing circuitry 16. However, storage capacity of the registers 22 is generally limited. As such, the processing sub-system 12 may be communicatively coupled to the memory sub-system 14, which provides additional data storage capacity, via one or more communication buses 20. In some embodiments, a communication bus 20 may include one or more cables, one or more wires, one or more conductive traces, one or more communication networks, or any combination thereof.

In other words, the processing sub-system 12 and the memory sub-system 14 may communicate via the one or more communication buses 20. For example, the processing sub-system 12 may communicate (e.g., output) a write memory access request along with data for storage in the memory sub-system 14 and/or a read memory access request targeting data previously stored in the memory sub-system 14. Additionally or alternatively, the memory sub-system 14 may communicate (e.g., output) target data previously storage therein, for example, in response to a read memory access request to enable processing and/or execution by the processing circuitry 16 implemented in the processing sub-system 12.

To provide data storage, as in the depicted example, the memory sub-system 14 may include one or more memory devices 18 (e.g., chips or integrated circuits). As will be described in more detail below, in some embodiments, the memory devices 18 may include memory cells (e.g., circuitry) organized into one or more memory arrays 28 and, thus, may include one or more tangible, non-transitory, computer-readable media. For example, the memory sub-system 14 may include one or more memory device 18 communicatively coupled to the processing sub-system 12 via a memory (e.g., external) bus 20.

However, as described above, data communication via an external communication bus 20 is generally slower than data communication within a processor-side of the external communication bus 20 and/or data communication within a memory-side of the external communication bus 20. At least in some instances, the difference in data communication speed and, thus, resulting data retrieval latency may be due at least in part to the external communication bus 20 being shared with other computing sub-systems, timing differences between components on the processor-side of the external communication bus 20 and components on the memory-side of the external communication bus 20, and/or communication distance between the processor-side of the external communication bus 20 and the memory-side of the external communication bus 20.

To facilitate improving data retrieval latency, the memory sub-system 14 may include one or more caches 24, which provide faster data communication speeds compared to the memory devices 18. As will be described in more detail below, in some embodiments, a cache 24 may provide storage locations organized into one or more cache lines 30, for example, to store an instance (e.g., copy) of data also stored in a memory array 28 implemented in one or more memory devices 18. Accordingly, in some embodiments, a cache 24 may be communicatively coupled between a memory device 18 and the processing circuitry 16 of the processing sub-system 12 and/or used to implement a lower memory layer compared to the memory device 18.

For example, the memory sub-system 14 may include one or more processor-side caches 24 implemented on a processor-side of an external communication bus 20. In some embodiments, one or more of the processor-side caches 24 may be integrated with the processing circuitry 16. For example, the processor-side caches 24 may include a level one (L1) cache, a level two (L2) cache, and/or a level three (L3) cache. Additionally or alternatively, the memory sub-system 14 may include one or more memory-side caches 24 implemented on a memory-side of the external communication bus 20. In other words, in some embodiments, a memory sub-system 14 may include a first (e.g., memory-side) portion implemented on a memory-side of the external communication bus 20 and a second (e.g., processor-side) portion implemented on a processor-side of the external communication bus 20.

To facilitate controlling data storage, as in the depicted example, the memory sub-system 14 may include one or more memory controllers 26, for example, communicatively coupled to the caches 24 and/or the memory devices 18 via one or more instruction buses 20A. As described above, in some embodiments, a memory controller 26 may be implemented using multiple controllers, such as a cache controller that controls data storage in cache memory levels and a DRAM controller that controls data storage in DRAM memory levels. Additionally, as described above, in some embodiments, a memory controller 26 may predictively control data storage to facilitate improving data retrieval latency provided by the memory sub-system 14 and, thus, operational efficiency of the computing system 10. To facilitate predictively controlling data storage, as in the depicted example, the memory sub-system 14 may include one or more machine learning blocks (e.g., circuitry or modules) 32.

As will be described in more detail below, in some embodiments, a machine learning block 32 may implement machine learning (e.g., neural network) techniques to facilitate predicting a data access pattern expected to occur during an upcoming (e.g., subsequent) control horizon (e.g., time period or one or more clock cycles). For example, using the machine learning block 32, a memory controller 26 may determine the predicted data access pattern expected to occur subsequently based at least in part on data access information 34 indicative of a previous data access pattern. Additionally, based at least in part on the predicted data access pattern, the memory controller 26 may predictively control (e.g., adjust) storage location of data in the memory sub-system 14, for example, such that data expected to be targeted (e.g., accessed) during the upcoming control horizon is stored at a lower (e.g., faster and smaller) memory level and/or such that data not expected to be targeted during the upcoming control horizon is stored at a higher (e.g., slower and larger) memory level.

In any case, as described above, in some embodiments, a memory sub-system 14 may include a processor-side portion and a memory-side portion separated by a memory (e.g., external) bus 20. In some embodiments, the memory sub-system 14 may nevertheless include a central memory controller 26 implemented to control data storage in both the processor-side of the memory sub-system 14 and the memory-side of the memory sub-system 14. In other embodiments, the memory sub-system 14 may include a processor-side memory controller 26 implemented to control data storage in the processor-side of the memory sub-system 14 and a memory-side memory controller 26 implemented to control data storage in the memory-side of the memory sub-system 14.

Figure 2:
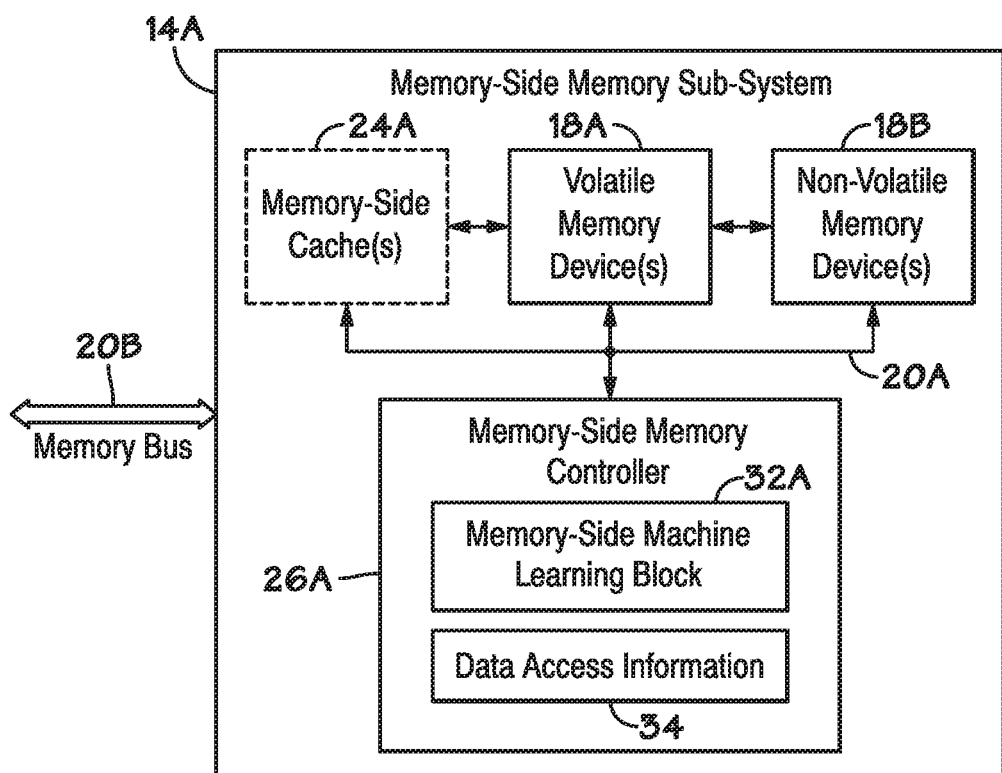
FIG. 2 is a block diagram of an example memory-side portion of the memory sub-system of FIG. 1, in accordance with an embodiment of the present disclosure.

To help illustrate, an example of a memory-side memory sub-system 14A, which includes a memory-side memory controller 26A, is shown in FIG. 2. As in the depicted example, a memory-side memory sub-system 14A may be communicatively coupled to a memory bus 20B. Additionally, the memory-side memory sub-system 14A may include one or more memory-side caches 24A, one or more volatile memory devices 18A, and/or one or more non-volatile memory devices 18B. However, it should be appreciated that the depicted example is merely intended to be illustrative and not limiting. For example, in other embodiments, the memory-side caches 24A may be obviated (e.g., optional).

In any case, a non-volatile memory device 18B may generally provide data storage using non-volatile memory. For example, the non-volatile memory device 18B may include a flash (e.g., NAND) memory device, a phase-change memory (e.g., 3D XPoint™) device, a ferroelectric random access memory (FeRAM) device, a solid state drive (SSD), a hard disk drive (HDD), or any combination thereof. On the other hand, a volatile memory device 18A may generally provide data storage using volatile memory. For example, the volatile memory device 18A may include a dynamic random-access memory (DRAM) device, a static random-access memory (SRAM) devices, or both.

Furthermore, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices 18 disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

It should be appreciated that one or more of the memory devices 18 may be implemented using other packing techniques. For example, memory devices 18 may be coupled to a (e.g., silicon) interposer to implement a 2.5D configuration. Additionally or alternatively, memory devices 18 may be stacked to implement a 3D configuration. Furthermore, in some embodiments, memory devices 18 may be implemented using organic packaging techniques. In other words, the techniques described in the present disclosure may be implemented as an on-package solution.

In any case, as described above, different memory types generally provide varying tradeoffs that affect operational efficiency and/or implementation associated cost, such as component count, manufacturing steps, and/or physical footprint, of a memory sub-system 14 and, thus, a computing system 10 in which the memory sub-system 14 is implemented. For example, non-volatile memory generally provides higher (e.g., greater) data storage density compared to volatile memory. Additionally, non-volatile memory cells, in contrast to volatile memory cells, may maintain storage of data even while in an unpowered state. On the other hand, volatile memory generally provides faster data communication (e.g., read and/or write) speeds compared to non-volatile memory. In fact, static random-access memory (SRAM) generally provide faster data communication speeds compared to dynamic random-access memory (DRAM).

Thus, to facilitate improving data retrieval latency, in some embodiments, a volatile memory device 18A may be used to implement a lower (e.g., smaller and faster) memory level compared to a non-volatile memory device 18B, for example, which implements a highest (e.g., largest and slowest) memory level. In any case, as described above, a memory device 18 generally provides data storage locations, for example, implemented via one or more memory cells. Additionally, as described above, the memory cells implemented in one or more memory devices 18 may be organized into a memory array 28.

Figure 3:
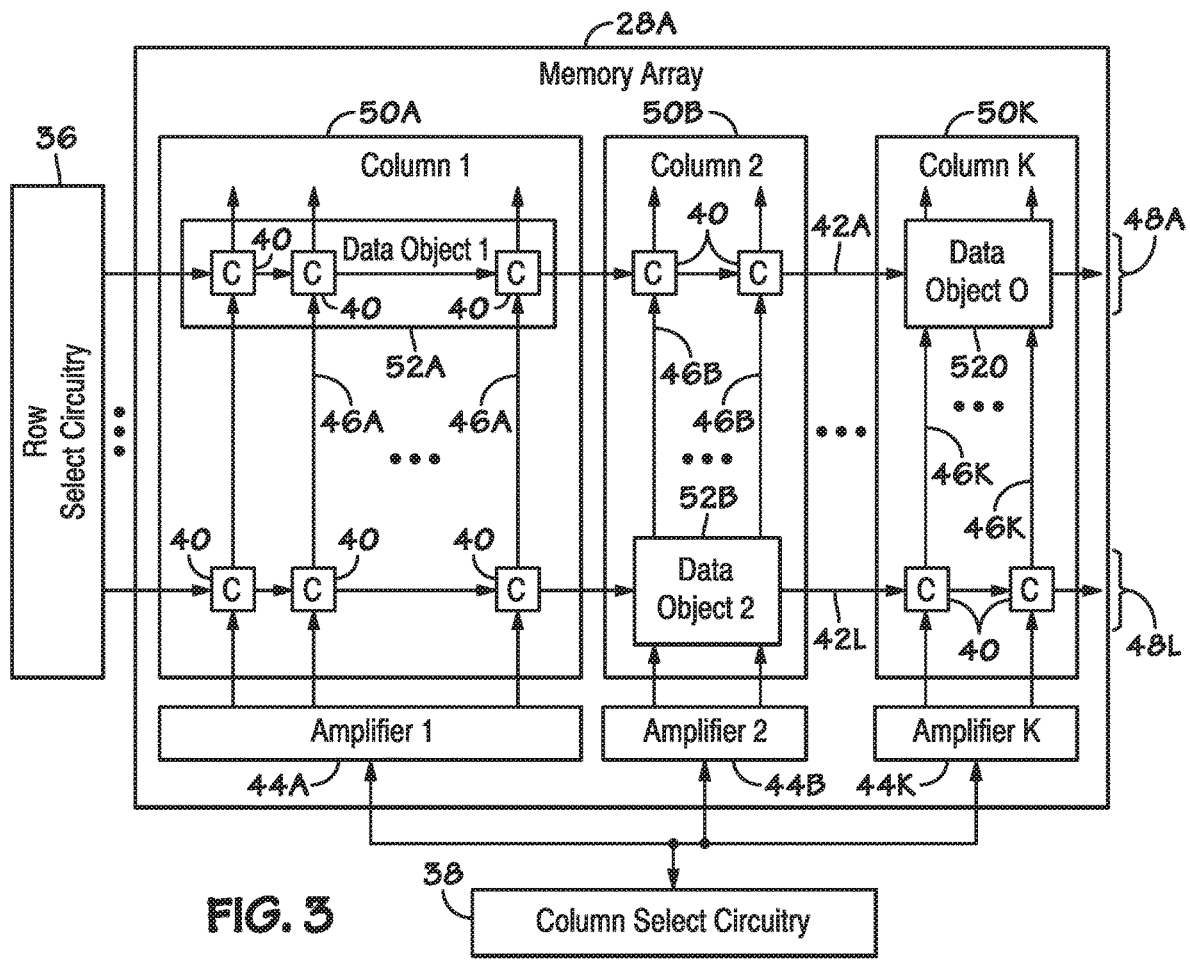
FIG. 3 is a block diagram of an example memory array that may be implemented in the memory sub-system of FIG. 1, in accordance with an embodiment of the present disclosure.

To help illustrate, an example of a memory array 28A, which may be implemented in one or more memory devices 18, is shown in FIG. 3. As in the depicted example, the memory array 28A may be coupled to row select (e.g., decoder) circuitry 36 and column select (e.g., decoder) circuitry 38. Additionally, as in the depicted example, the memory array 28A may include memory cells 40 coupled to the row select circuitry 36 via word lines 42 formed in a first (e.g., horizontal) direction and to amplifier circuitry 44 via bit lines 46 formed in a second (e.g., vertical) direction.

In some embodiments, each memory cell 40 may include a switching component, such as a metal-oxide-semiconductor field-effect transistor (MOSFET), and a storage component, such as a capacitor. For example, a memory cell 40 may be implemented such that its MOSFET is coupled between a bit line 46 and its storage capacitor and the gate of its MOSFET is coupled to a word line 42. As such, in some embodiments, each memory cell 40 may be used to store one bit of data.

For example, a memory cell 40 may indicate a 1-bit when charge stored in the memory cell 40 results in a voltage greater than a threshold voltage. On the other hand, the memory cell 40 may indicate a 0-bit when charge stored in the memory cell 40 results in a voltage less than the threshold voltage. In other embodiments, a memory cell 40 may be implemented to store multiple bits of data. For example, a memory cell 40 in Quad-Level Cell (QLC) NAND memory may be implemented to store two bits of data.

In any case, as in the depicted example, the memory cells 40 may be organized into one or more memory cell rows 48, which may each be identified by a corresponding row address (e.g., physical memory address), and one or more memory cell columns 50, which may each identified by a corresponding column address (e.g., physical memory address). In some embodiments, a memory cell row 48 may include each of the memory cells 40 coupled to a (e.g., one) word line 42. For example, a first memory cell row 48A may include each of the memory cells 40 coupled to a first word line 42A and an Lth memory cell row 48L may include each of the memory cells 40 coupled to an Lth word line 42L.

As in the depicted example, organizing the memory array 28A in this manner may enable memory cells 40 to be grouped into storage locations each suitable for storage of a data object 52. For example, a first data object 52A may be stored at a first storage location including the memory cells 40 in the first memory cell row 48A and a first memory cell column 50A, a second data object 52B may be stored at a second storage location including the memory cells 40 in an Lth memory cell row 48L and a second memory cell column 50B, and a Kth data object 52K may be stored at a Kth storage location including the memory cells 40 in the first memory cell row 48A and the Kth memory cell column 50K. As described above, in some embodiments, a data object 52 may include a data block and metadata, for example, which indicates context of the data block.

Figure 4:
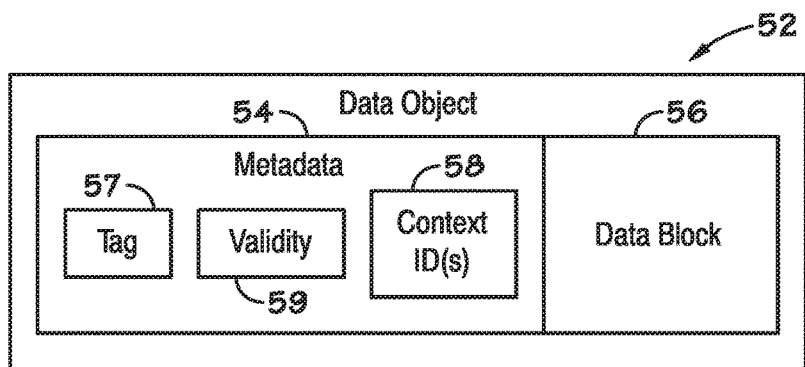
FIG. 4 is a diagrammatic representation of an example data object that may be stored in the memory sub-system of FIG. 1, in accordance with an embodiment of the present disclosure.

To help illustrate, an example of a data object 52 is shown in FIG. 4. As in the depicted example, a data object 52 may include metadata 54 concatenated in front of (e.g., prepended to) a data block 56. However, it should be appreciated that the depicted example is merely intended to be illustrative and not limiting. For example, in other embodiments, the metadata 54 may be concatenated behind (e.g., appended to) the data block 56 or otherwise associated (e.g., multiplexed and/or interleaved) with the data block 56.

In any case, a data block 56 generally includes related data, for example, which is expected to be processed (e.g., analyzed and/or interpreted) together. To facilitate identifying the data block 56, as in the depicted example, the metadata 54 may include tag metadata 57. In some embodiments, the tag metadata 57 may be indicative of the storage location of the data block 56 and/or the data object 52 in an address space and, thus, may be used to identify the data block 56 and/or the data object 52. In other words, in some embodiments, the tag metadata 57 may indicate a virtual memory address of the data block 56, a physical memory address of the data block 56, or a value determined based on the virtual memory address and the physical memory address of the data block 56.

Additionally, as in the depicted example, the metadata 54 may include validity metadata 59, which is indicative of validity of the data block 56. In some embodiments, the validity metadata 59 may include a validity bit, which indicates that the data block 56 is valid when set (e.g., "1" bit) and invalid when not set (e.g., "0" bit). Additionally or alternatively, the validity metadata 59 may facilitate detecting whether the data block 56 is valid and/or correcting the data block 56 when invalid. For example, the validity metadata 59 may include one or more error checking codes, such as an inversion bit, a poison bit, a parity bit, an error-detecting code (EDC), an error-correcting code (ECC), a Bose-Chaudhuri-Hocquenghem (BCH) code, a message authentication code (MAC), a cyclic redundancy check (CRC) code, or any combination thereof.

Furthermore, as in the depicted example, the metadata 54 may include context metadata 58, which indicates one or more context identifiers associated with the data block 56. For example, the context metadata 58 may include a type identifier, which indicates the type of data included in the data block 56. For example, the type identifier may indicate whether the data block 56 includes image data, virtual machine data, executable instructions, audio data, or any combination thereof. Additionally, in some embodiments, the context metadata 58 may include one or more association identifiers, which indicate aspects of a computing system 10 associated with generation and/or processing of the data block 56.

For example, the context metadata 58 may include a process identifier, which indicates a process running on the computing system 10 that resulted in generation of the data block 56 and/or a process expected to target the data block 56 when run in the computing system 10. Additionally, in some embodiments, the context metadata 58 may include a user identifier, which indicates a user of the computing system 10 for which the data block 56 was generated and/or a user of the computing system 10 for which the data block 56 is expected to be targeted. Furthermore, in some embodiments, the context metadata 58 may include a thread identifier, which indicates a processor thread that generated the data block 56 and/or a processor thread expected to target the data block 56.

Moreover, in some embodiments, the context metadata 58 may include a core identifier, which indicates a processor core that generated the data block 56 and/or a processor core expected to target the data block 56. Additionally, in some embodiments, the context metadata 58 may include a virtual machine identifier, which indicates a virtual machine that resulted in generation of the data block 56 and/or a virtual machine expected to target the data block 56 when run in the computing system 10. Furthermore, in some embodiments, the context metadata 58 may include an application identifier, which indicates an application running on the computing system 10 that resulted in generation of the data block 56 and/or a process expected to target the data block 56 when run in the computing system 10.

In a similar manner, the context metadata 58 may additionally or alternatively be implemented to indicate other context identifiers, such as a custom identifier. Moreover, in some embodiments, a data block 56 may be associated with multiple different aspects of a computing system 10. For example, a data block 56 may be generated by a specific processor core to provide a specific user a specific virtual machine. Thus, in some embodiments, context metadata 58 may indicate multiple context identifiers associated with the data block 56. For example, a first context identifier may indicate the specific processor core, a second context identifier may indicate the specific user, and a third context identifier may indicate the specific virtual machine. In this manner, a data block 56 may be associated with metadata 54, which indicates context of the data block 56, as a data object 52.

Returning to the memory array 28A of FIG. 3, as described above, data objects 52 may be stored at and/or retrieved from storage locations in the memory array 28A. As described above, row select circuitry 36 may be connected to rows of the memory array 28A via corresponding word lines 42. Thus, to enable reading and/or writing a memory cell 74, row select circuitry 36 may activate the memory cell 74, for example, by outputting an activation (e.g., logic high) signal via a corresponding word line 42 that causes the switching component of the memory cell 40 to electrically couple the storage component of the memory cell 40 to a corresponding bit line 46.

Moreover, as described above, column select circuitry 38 may be coupled to columns of the memory array 28A. In other words, the column select circuitry 38 may be coupled to the first memory cell column 50A via the first bit lines 46A and first amplifier circuitry 44A, the second memory cell column 50B via second bit lines 46B and second amplifier circuitry 44B, and the Kth memory cell column 50K via the Kth bit lines 46K and Kth amplifier circuitry 44K. In some embodiments, amplifier circuitry 44 may include a driver to facilitate storing (e.g., writing) data into the memory cells 40 and/or a sense amplifier to facilitate outputting (e.g., reading) data from the memory cells 40.

Additionally, in some embodiments, the column select circuitry 38 may selectively enable reading from and/or writing to a memory cell column 50, for example, by outputting a column select to amplifier circuitry 44. In other words, to read data (e.g., first data object 52A) from and/or to write data to the first memory cell column 50A, the column select circuitry 38 may output a column select (e.g., logic high) signal to the first amplifier circuitry 44A. Similarly, to read data (e.g., second data object 52B) from and/or to write data to the second memory cell column 50B, the column select circuitry 38 may output a column select signal to the second amplifier circuitry 44B. Furthermore, to read data (e.g., Oth data object 52O) from and/or to write data to the Kth memory cell column 50K, the column select circuitry 38 may output a column select signal to the Kth amplifier circuitry 44K. In this manner, memory cells 40 in one or more memory devices 18 may be organized to implement a memory array 28 in a memory sub-system 14.

Returning to the memory-side memory sub-system 14A of FIG. 2, as described above, in addition to the memory devices 18, in some embodiments, the memory-side memory sub-system 14A may include one or more memory-side caches 24A. Additionally, as described above, a cache 24 may be implemented in a memory sub-system 14 to provide a lower memory level compared to a memory array 28 implemented in the memory sub-system 14. In other words, in some embodiments, a memory-side cache 24A may be implemented to, on average, provide faster data communication speed compared to the memory array 28.

Thus, in some embodiments, a memory-side cache 24A may also be implemented using volatile memory. For example, the memory-side cache 24A may be implemented with static random-access memory (SRAM) while a volatile memory devices 18A is implemented with dynamic random-access memory (DRAM). Additionally or alternatively, the memory-side cache 24 and the volatile memory device 18A may be implemented using the same memory type (e.g., DRAM). In fact, in some embodiments, one or more memory-side caches 24A may be implemented in a volatile memory device 18A. In any case, as described above, a cache 24 may be implemented to provide storage locations organized into one or more cache lines 30, for example, to store an instance (e.g., copy) of data also stored in a memory array 28.

Figure 5:
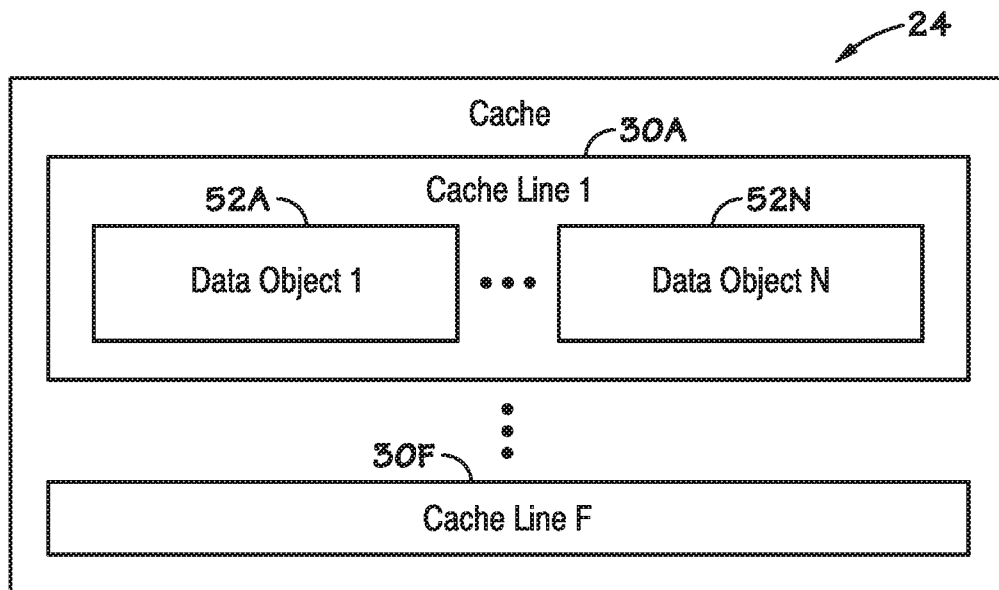
FIG. 5 is a block diagram of an example cache (e.g., processor-side cache or memory-side cache) that may be implemented in the memory sub-system of FIG. 1, in accordance with an embodiment of the present disclosure.

To help illustrate, an example of a cache (e.g., memory-side cache 24A and/or processor-side cache) is shown in FIG. 5. As in the depicted example, a cache 24 may provide storage locations organized into multiple cache lines 30—namely a first cache line 30A, an Fth cache line 30F, and so on. Additionally, as in the depicted example, storage locations included in a cache line 30 may be allocated to enable storage of one or more data objects 52 (e.g., 50A-50N). For example, the first cache line 30A may be implemented with a line width that enables storage of N valid data objects 52. However, it should be appreciated that the depicted example is merely intended to be illustrative and not limiting. For example, in other embodiments, a cache line 30 may be allocated with a line width that enables storage of a single valid data object 52 or more than two valid data objects 52.

In any case, as described above, a data object 52 may include a data block 56 and metadata 54 (as illustrated in FIG. 4). For example, as described above, the metadata 54 may include validity metadata 59, which is indicative of whether the data block 56 and, thus, the data object 52 is valid. Additionally, as described above, in some embodiments, the metadata 54 may include context metadata 58, which indicates context of the data block 56. For example the context metadata 58 may include a type identifier and/or one or more association identifiers, such a process identifier, an application identifier, a user identifier, a virtual machine identifier, a thread identifier, a core identifier, a custom identifier, or any combination thereof.

Furthermore, as described above, in some embodiments, the metadata 54 may include tag metadata 57, which is indicative of storage location of the data block 56 and/or the data object 52 in an address space. For example, tag metadata 57 associated with a data block 56 may be determined based at least in part on a virtual memory address used by processing circuitry 16 to identify the data block 56 and/or a physical memory address at which the data block 56 is stored or is to be stored in a memory array 28. As such, in some embodiments, the tag metadata 57 may be used to identify the data block 56 and/or the data object 52.

In fact, in some embodiments, a memory sub-system 14 may search for data targeted by a read memory access request based at least in part on a target value of tag metadata 57 expected to be associated with the data. For example, the memory sub-system 14 may determine the target value of the tag metadata 57 expected to be associated with a target data block 56 based at least in part on a virtual memory address and/or a physical memory address indicated in the read memory access request. Based at least in part on the target value, the memory sub-system 14 may determine whether the target data block 56 results in a cache miss by searching tag metadata 57 associated with valid data blocks 56 currently stored in a cache 24.

For example, the memory sub-system 14 may determine that the target data block 56 is currently stored in a cache 24 when the target tag metadata 57 matches the tag metadata 57 associated with a valid data block 56 stored therein and, thus, results in a cache hit. On the other hand, the memory sub-system 14 may determine that the target data block 56 is not currently stored in a cache 24 when the target tag metadata 57 does not match tag metadata 57 associated with any valid data block 56 stored therein and, thus, results in a cache miss. Accordingly, on the average, data retrieval latency provided by a cache 24 may vary with its storage capacity, for example, due to increasing storage capacity enabling more valid data objects 52 to be stored therein.

In fact, to facilitate improving data retrieval latency, in some embodiments, different caches 24 may be used to implement different hierarchical memory levels with varying storage capacities. For example, different memory levels may be implemented with differing number of cache lines 30. As an illustrative example, a cache 24 used to provide a lower memory level may be implemented with fewer cache lines 30 compared to a cache 24 used to provide a higher memory level. Additionally or alternatively, line width of a cache line 30 implemented in a lower memory level may be allocated to enable storage of fewer valid data objects 52 compared to a cache line 30 implemented in a higher memory level. In any case, in this manner, a cache 24 (e.g., memory-side cache 24A and/or processor-side cache) may be implemented in a memory sub-system 14 to provide storage locations organized into one or more cache lines 30.

Returning to the memory-side memory sub-system 14A of FIG. 2, as described above, the memory-side memory controller 26A may control data storage in the memory-side memory sub-system 14A, for example, by controlling whether a data object 52 is stored in a memory-side cache 24A, a volatile memory device 18A, a non-volatile memory device 18B, or any combination thereof. In other words, the memory-side memory controller 26A may control whether the data object 52 is stored in a (e.g., lower intermediate) memory level implemented in the memory-side cache 24A, a (e.g., higher intermediate) memory level implemented in the volatile memory device 18A, a (e.g., highest) memory level implemented in the non-volatile memory device 18B, or any combination thereof. As described above, in some embodiments, a memory controller 26 may control data storage based at least in part on data access information 34.

Figure 6:
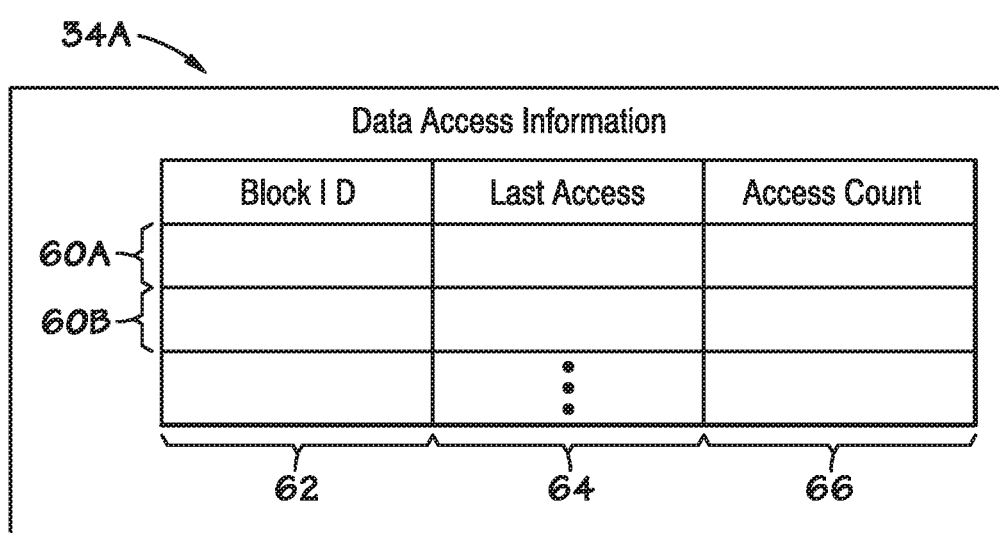
FIG. 6 is a diagrammatic representation of example data access information that may be tracked and/or used by the memory sub-system of FIG. 1, in accordance with an embodiment of the present disclosure.

To help illustrate, an example of data access information 34A, which may be updated and/or used by a memory controller 26, is shown in FIG. 6. As in the depicted example, data access information 34A may include a table with multiple rows 60, a block identifier column 62, a last access time column 64, and an access count column 66. It should be appreciated that the depicted example is merely intended to be illustrative and not limiting. For example, in other embodiments, the data access information 34 may additionally or alternatively include other types of information and/or parameters.

With regard to the depicted example, the block identifier column 62 may identify data blocks 56 stored in a memory sub-system 14, for example, via tag metadata 57, a virtual memory address, and/or a physical memory address associated with the data block 56. Additionally, each row 60 in the data access information 34A may associate a data block 56 identified in the block identifier column 62 to a last access time parameter indicated in the last access time column 64 and an access count parameter indicated in the access count column 66. For example, the first row 60A may associate a first data block 56 identified in the block identifier column 62 with a last access time parameter identified in the last access time column 64, which indicates when the first data block 56 was most recently accessed (e.g., targeted), and an access count parameter identified in the access count column 66, which indicates the number of times the first data block 56 has previously been accessed. Similarly, the second row 60B may associate a second data block 56 identified in the block identifier column 62 with a last access time parameter identified in the last access time column 64, which indicates when the second data block 56 was most recently accessed, and an access count parameter identified in the access count column 66, which indicates the number of times the second data block 56 has previously been accessed. In this manner, one or more data blocks 56 stored in a memory sub-system 14 may be associated with data access information 34.

Returning to the memory-side memory sub-system 14A of FIG. 2, as described above, the memory-side memory controller 26A may control data storage in the memory-side memory sub-system 14A based at least in part on the data access information 34. Additionally, as described above, to facilitate improving data retrieval latency, in some embodiments, a memory controller 26 may predictively control data storage in a memory sub-system 14, for example, by determining a predicted data access pattern expected to occur during an upcoming (e.g., subsequent) control horizon (e.g., time period or one or more clock cycles) and controlling (e.g., adjusting) memory level at which data is stored in the memory sub-system 14 accordingly. Furthermore, as described above, in some embodiments, a memory controller 26 may utilize machine learning techniques to facilitate predicting the upcoming data access pattern. For example, the memory-side memory controller 26A may predict a subsequent (e.g., upcoming) data access pattern using a memory-side machine learning block 32A (e.g., circuitry or module) that implements machine learning techniques, such as a neural network technique.

Figure 7:
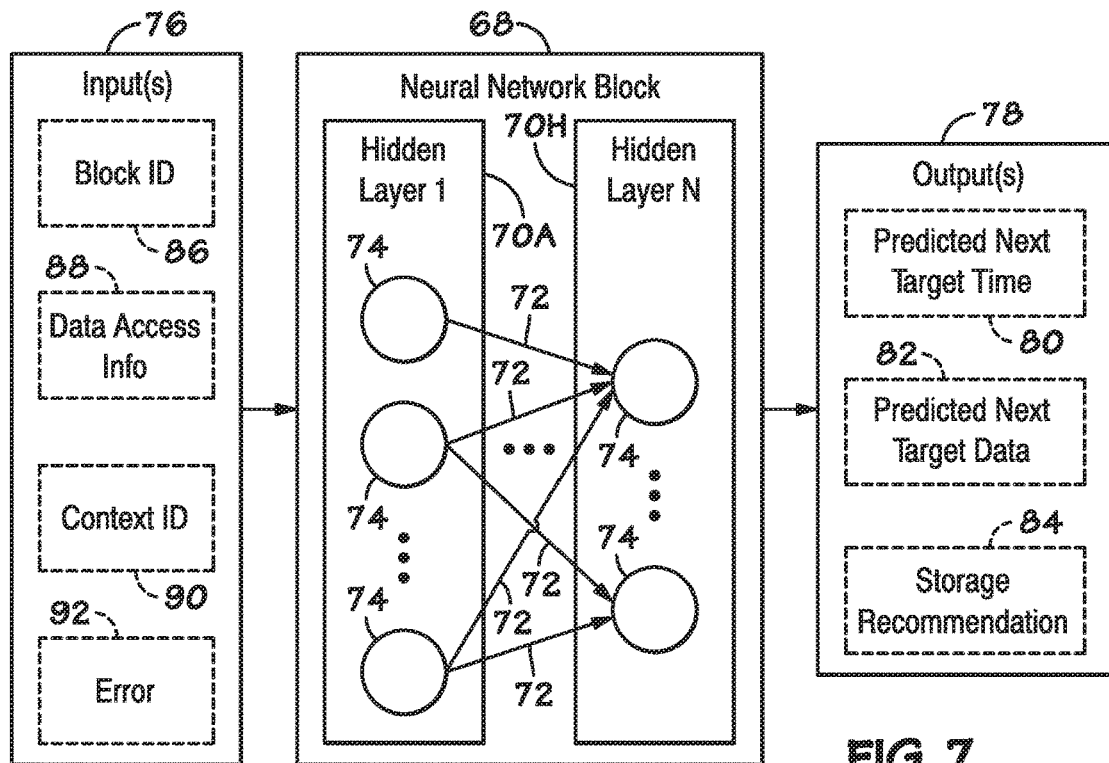
FIG. 7 is a block diagram of an example machine learning block that implements neural network techniques to facilitate predictively controlling data storage in the memory sub-system of FIG. 1, in accordance with an embodiment of the present disclosure.

To help illustrate, an example of a neural network block 68, which may be implemented in a memory controller 26 (e.g., memory-side memory controller 26A or processor-side memory controller), is shown in FIG. 7. As in the depicted example, a neural network block 68 may include one or more hidden (e.g., convolution) layers 70 connected via one or more layer interconnections 72. Additionally, as in the depicted example, a hidden layer 70 may include one or more nodes 74, which each applies a weight. For example, nodes 74 in a first hidden layer 70A may apply weights to one or more input parameters 76 and output results of the weightings to a downstream hidden layer 70 via one or more layer interconnections 72. Additionally, nodes 74 in an Hth hidden layer 70H may apply weights to inputs (e.g., results received from an upstream hidden layer 70) to determine one or more output parameters 78.

As described above, in some embodiments, the output parameters 78 of a machine learning block 32 may be indicative of a data access pattern expected to occur during an upcoming control horizon. For example, the output parameters 78 may include a predicted next target time parameter 80, which indicates when one or more data blocks 56 are next expected to be targeted (e.g., accessed). Additionally or alternatively, the output parameters 78 may include a predicted next target data parameter 82, which indicates one or more data block 56 that are expected to be targeted next.

Furthermore, in some embodiments, the output parameters 78 may include a storage recommendation parameter 84, which indicates one or more memory level recommendations and/or one or more flush (e.g., replacement) recommendations. For example, the storage recommendation parameter 84 may recommend a memory level at which to store a data block 56. Since storage capacity of a lower memory level is generally limited, in some embodiments, the storage recommendation parameter 84 may recommend one or more other data blocks 56 to flush (e.g., replace) from the lower memory level to make room for another data block 56 to be subsequently stored therein.

On the other hand, as described above, in some embodiments, the input parameters 76 of a machine learning block 32 may be indicative of one or more previous data access patterns. For example, the input parameters 76 may include a block identifier parameter 86, which identifies one or more previously targeted data blocks 56, for example, via associated tag metadata 57, virtual memory addresses, and/or physical memory addresses. Additionally, the input parameters 76 may include a data access information parameter 88, which indicates data access information 34 associated with one or more data blocks 56.

Furthermore, in some embodiments, the input parameters 76 may include a context identifier parameter 90, which indicates context (e.g., type and/or association) identifiers associated with one or more data blocks 56. In other words, in such embodiments, the type of data included in one or more data blocks 56 may be input and, thus, considered by a machine learning block 32 (e.g., neural network block 68). Additionally or alternatively, in such embodiments, one or more aspects of a computing system associated with (e.g., generated and/or expected to target) a data block 56 and, thus, considered by the machine learning block 32.

As described above, in some embodiments, prediction accuracy of machine learning techniques may be improved by enabling a machine learning block 32 to consider context of data and/or corresponding memory access requests when predicting a subsequent data access pattern. For example, when predicting a data access pattern expected to result from running a specific application in a computing system 10, the machine learning block 32 may more heavily weight previous targeting of a data block 56 generated by the specific application compared to another data block 56 generated by a different application running in the computing system 10. Additionally or alternatively, when predicting the data access pattern expected to result from the specific application, the machine learning block 32 may more heavily weight a previous memory access request resulting from running the specific application in the computing system 10 compared to another previous memory access request that resulted in running a different application in the computing system 10.

In fact, to facilitate varying weightings based at least in part on context, in some embodiments, a neural network block 68 may include multiple neural networks implemented for different purposes. For example, the neural network block 68 may include a neural network implemented to output a prediction of a data block 56 that will be targeted next and another neural network implemented to output a predicted next target time of a specific data block 56. Additionally or alternatively, the neural network block 68 may include neural networks geared to different aspects of the computing system 10.

For example, the neural network block 68 may include a first neural network implemented to output an indication of a predicted data access pattern expected to result from running a first application in the computing system 10 and a second neural network implemented to output an indication of a prediction data access pattern expected to result from running a second application in the computing system 10. Additionally, in some embodiments, the neural network block 68 may include a neural network implemented to output an indication of a predicted data access pattern expected to result from a first processor core in the computing system 10 and another neural network implemented to output an indication of a prediction data access pattern expected to result from a second processor core in the computing system 10. Furthermore, in some embodiments, the neural network block 68 may include a neural network implemented to output an indication of a predicted data access pattern expected to result from running a first virtual machine in the computing system 10 and another neural network implemented to output an indication of a predicted data access pattern expected to result from running a second virtual machine in the computing system 10.

Moreover, in some embodiments, the neural network block 68 may include a neural network implemented to output an indication of a predicted data access pattern expected to result from running a first process in the computing system 10 and another neural network implemented to output an indication of a prediction data access pattern expected to result from running a second application in the computing system 10. Additionally, in some embodiments, the neural network block 68 may include a neural network implemented to output an indication of a predicted data access pattern expected to result from a first processor thread in the computing system 10 and another neural network implemented to output an indication of a prediction data access pattern expected to result from a second processor thread in the computing system 10. Furthermore, in some embodiments, the neural network block 68 may include a neural network implemented to output an indication of a predicted data access pattern expected to result from a first user using the computing system 10 and another neural network implemented to output an indication of a predicted data access pattern expected to result from a second user using the computing system 10

As such, to facilitate improving accuracy, in some embodiments, a neural network block 68 may selectively route input parameters 76 to different portions (e.g., neural networks) of the neural network block 68 based at least in part on corresponding context. For example, when a first context identifier indicates that a first data block 56 was generated due to the first application running in the computing system 10, the neural network block 68 may route data access information 88 associated with the first data block 56 to the first neural network corresponding with the first application. On the other hand, when a second context identifier indicates that a second data block 56 was generated due to the second application running in the computing system 10, the neural network block 68 may route data access information 88 associated with the second data block 56 to the second neural network corresponding with the second application.

To facilitate accounting for context, in some embodiments, a memory controller 26 may include multiple neural network blocks 68, for example, instead of a single neural network block 68 with multiple neural networks geared toward different aspects of the computing system 10. As an illustrative example, the memory controller 26 may include a first neural network block 68 implemented to output an indication of the predicted data access pattern expected to result from running the first application in the computing system 10 and a second neural network block 68 implemented to output an indication of the predicted data access pattern expected to result from running the second application in the computing system 10. Accordingly, in such embodiments, the memory controller 26 may selectively route input parameters 76 to different neural network blocks 68 based at least in part on corresponding context.

In any case, in some embodiments, the input parameters 76 supplied to a machine learning block 32 may include a prediction error parameter 92, which indicates an error between one or more previously predicted data access patterns and corresponding actual data access patterns. For example, the prediction error parameter 92 may indicate an error between a predicted next target time of a data block 56 identified by the predicted next target time parameter 80 relative to actual target time of the data block 56. Additionally or alternatively, the prediction error parameter 92 may indicate whether there was an error between a predicted next target data block 56 identified by the predicted next target data parameter 82 and the data block 56 that was actually targeted next.

As described above, in some embodiments, feeding the prediction error parameter 92 back to a machine learning block 32 may facilitate improving subsequent prediction accuracy. For example, based at least in part on the prediction error parameter 92, the neural network block 68 may adjust machine learning parameters, such as number of hidden layers 70, number of nodes 74 per hidden layer 70, weights applied by one or more nodes 74, and/or configuration (e.g., number and/or interconnected nodes 74) of the layer interconnections 72. In this manner, a memory controller 26 (e.g., processor-side memory controller and/or memory-side memory controller 26) may use a machine learning block 32, such as a neural network block 68, to determine a predicted data access pattern expected to occur during an upcoming control horizon.

Returning to the memory-side memory sub-system 14A of FIG. 2, as described above, the memory-side memory controller 26A may control data storage in the memory-side memory sub-system 14A during the control horizon based at least in part on the predicted data access pattern. For example, based at least in part on the predicted data access pattern, the memory-side memory controller 26A may determine whether to store a data block 56 in a first memory-side memory level implemented by one or more memory-side caches 24A, a second memory-side memory level implemented by one or more volatile memory arrays 28, and/or a third memory-side memory level implemented by one or more non-volatile memory arrays 28. In any case, as described above, in some embodiments, a portion of a memory sub-system 14 may additionally or alternatively be implemented on a processor-side of a memory bus 20B.

Figure 8:
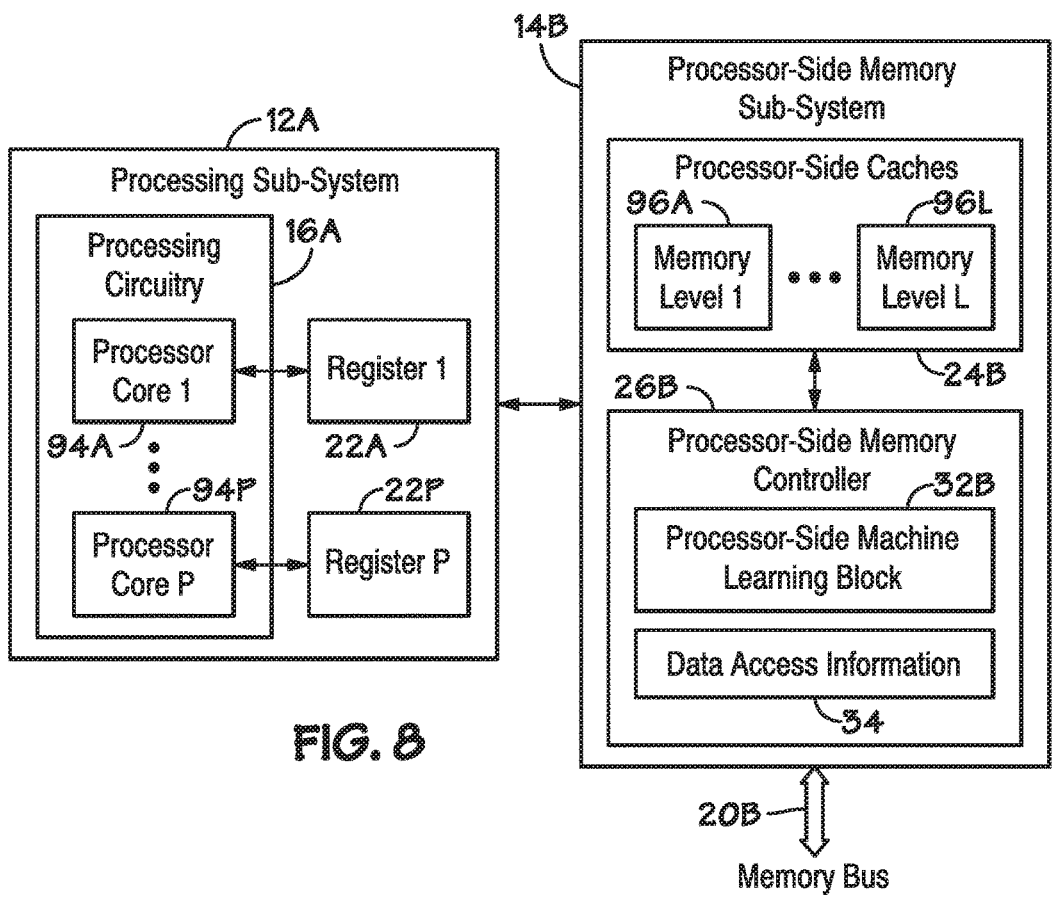
FIG. 8 is a block diagram of an example processor-side portion of the memory sub-system of FIG. 1, in accordance with an embodiment of the present disclosure.

To help illustrate, an example of a processor-side memory sub-system 14B, which includes a processor-side memory controller 26B, is shown in FIG. 8. As in the depicted example, a processor-side memory sub-system 14B may be communicatively coupled to a memory bus 20B. Additionally, as in the depicted example, the processor-side memory sub-system 14B may be communicatively coupled to a processing sub-system 12A via an internal bus 20C.

As described above, in some embodiments, processing circuitry 16 of a processing sub-system 12 may be implemented using one or more processor cores 94. For example, the processing circuitry 16A may include a first processor core 94A and a Pth processor core 94P. Additionally, as described above, in some embodiments, a processing sub-system 12 may include one or more registers 22, which provide storage locations directly accessible by its processing circuitry 16. For example, a first register 22A may provide storage locations directly accessible by the first processor core 94A and a Pth register 22P may provide storage locations directly accessible by the Pth processor core 94P.

To facilitate increasing storage provided on the processor-side of the memory bus 20B, as in the depicted example, the processor-side memory sub-system 14B may include one or more processor-side caches 24B. In some embodiments, a processor-side cache 24B may be implemented using volatile memory, such as static random-access memory (SRAM) and/or dynamic random-access memory (DRAM). Additionally, in some embodiments, the processor-side caches 24B may be organized to implement one or more hierarchical memory levels 96. For example, a first one or more processor-side caches 24 may be used to implement a first (e.g., lower) memory level 96A and an Lth one or more processor-side caches may be used to implement an Lth (e.g., higher) memory level 96L.

Moreover, in some embodiments, the processor-side caches 24B may include one or more private processor-side caches 24B, which may be dedicated to a corresponding processor core 94. For example, the first memory level 96A may include a first one or more private processor-side caches 24B (e.g., L1 and/or L2 cache) dedicated to the first processor core 94A and a Pth one or more private processor-side caches 24B dedicated to the Pth processor core 94P. Furthermore, in some embodiments, the processor-side caches 24B may include one or more shared processor-side caches 24B, which may be shared by multiple processor cores 94. For example, the Lth memory level 96L may include one or more processor-side caches 24B (e.g., L3 cache) shared by the first processor core 94A and the Pth processor core 94P.

In any case, as described above, the processor-side memory controller 26B may control data storage in the processor-side memory sub-system 14B, for example, based at least in part on data access information 34. In other words, the processor-side memory controller 26B may control whether data is stored in the first memory level 96A, the Lth memory level 96L, an intermediate memory level 96 between the first memory level 96A and the Lth memory level 96L, or any combination thereof. To facilitate improving data retrieval latency, in some embodiments, the processor-side memory controller 26B may predictively control data storage in the processor-side memory sub-system 14B, for example, by determining a predicted data access pattern expected to occur during an upcoming (e.g., subsequent) control horizon (e.g., time period or one or more clock cycles) and controlling (e.g., adjusting) memory level at which data is stored in the memory sub-system 14 accordingly. Additionally, in some embodiments, the processor-side memory controller 26B may utilize machine learning techniques to facilitate predicting the upcoming data access pattern. For example, the processor-side memory controller 26B may predict an upcoming data access pattern using a processor-side machine learning block 32B (e.g., circuitry or module) that implements machine learning techniques, such as a neural network technique.

To facilitate improving prediction accuracy and, thus, efficacy of predictive data storage techniques, as described above, in some embodiments, an upcoming data access pattern may be predicted with consideration of context of data stored in a memory sub-system 14, data to be stored in the memory sub-system 14, one or more previous data access patterns, one or more previous memory access requests, or any combination thereof. Additionally, as described above, in some embodiments, context of data and, thus, a corresponding memory access request, may be indicated via one or more context identifiers included in the memory access request. Additionally or alternatively, as described above, one or more context identifiers may be associated (e.g., grouped) with a data block 56 as a data object 52.

To help illustrate, an example of a process 100 for generating a data object 52 is described in FIG. 9. Generally, the process 100 includes determining context of a data block (process block 102), determining metadata to indicate the context (process block 104), and associating the metadata and the data block as a data object (process block 106). Although described in a particular order, which represents a particular embodiment, it should be noted that the process 100 may be performed in any suitable order. Additionally, embodiments of the process 100 may omit process blocks and/or include additional process blocks. Moreover, in some embodiments, the process 100 may be implemented at least in part by executing instructions stored in a tangible, non-transitory, computer-readable medium, such as memory implemented in a memory controller 26 and/or a processing sub-system 12, using processing circuitry, such as a processor implemented in the memory controller 26 and/or the processing sub-system 12.

Accordingly, in some embodiments, a memory controller 26 (e.g., memory-side memory controller 26A and/or processor-side memory controller 26B) may determine context of a data block 56 (process block 102). As describe above, in some embodiments, context of a data block 56 may include the type of data included in the data block 56. For example, the memory controller 26 may analyze the data block 56 to determine whether the data block 56 includes image data, virtual machine data, executable instructions, audio data, or any combination thereof. Additionally or alternatively, the memory controller 26 may receive an indication of the type of data included in the data block 56, for example, via a user input and/or from a processing sub-system 12.

Furthermore, as described above, in some embodiments, context of a data block 56 may include aspects of a computing system 10 associated with (e.g., generated and/or expected to target) the data block 56. For example, the context may include a process running on the computing system 10 that resulted in generation of the data block 56, an application running on the computing system 10 that resulted in generation of the data block 56, a processor thread that generated the data block 56, a user of the computing system 10 for which the data block 56 was generated, and/or a virtual machine that resulted in generation of the data block 56. Additionally or alternatively, the context may include a process expected to target the data block 56 when run in the computing system 10, a processor thread expected to target the data block 56, a processor core 94 expected to target the data block 56, a user of the computing system 10 for which the data block 56 is expected to be targeted, and/or a virtual machine expected to target the data block 56 when run in the computing system 10.

Based at least in part on the context of the data block 56, the memory controller 26 may determine metadata 54 to be associated with the data block 56 (process block 104). As described above, in some embodiments, metadata 54 may include tag metadata 57 that identifies the data block 56. For example, the memory controller 26 may determine the tag metadata 57 to be associated with the data block 56 based at least in part on a virtual memory address and/or a physical memory address associated with the data block 56. Additionally, as described above, in some embodiments, metadata 54 may include validity metadata 59 indicative of validity the data block 56. For example, the memory controller 26 may determine the validity metadata 59 to be associated with the data block 56 at least in part by analyzing the data block 56 to determine its validity and/or one or more error checking codes, which may later be used to determine whether the data block 56 is valid and/or correcting the data block 56 when invalid.

Furthermore, as described above, metadata 54 may include context metadata 58 that indicates context of the data block 56. In other words, the context metadata 58 may indicate one or more context identifiers. For example, the memory controller 26 may include a type identifier in the context metadata 58 to indicate whether the data block 56 includes image data, virtual machine data, executable instructions, audio data, or any combination thereof.

Additionally or alternatively, the memory controller 26 may include one or more association identifiers in the context metadata 58 to indicate aspects of a computing system 10 associated with the data block 56. For example, the memory controller 26 may include a process identifier in the context metadata 58 to indicate the process running on the computing system 10 that resulted in generation of the data block 56 and/or the process expected to target the data block 56 when run in the computing system 10. Additionally, in some embodiments, the memory controller 26 may include a user identifier in the context metadata 58 to indicate the user of the computing system 10 for which the data block 56 was generated and/or the user of the computing system 10 for which the data block 56 is expected to be targeted. Furthermore, in some embodiments, the memory controller 26 may include a thread identifier in the context metadata 58 to indicate the processor thread that generated the data block 56 and/or the processor thread expected to target the data block 56.

Moreover, in some embodiments, the memory controller 26 may include a core identifier in the context metadata 58 to indicate the processor core 94 that generated the data block 56 and/or the processor core 94 expected to target the data block 56. Additionally, in some embodiments, the memory controller 26 may include a virtual machine identifier in the context metadata 58 to indicate the virtual machine that resulted in generation of the data block 56 and/or the virtual machine expected to target the data block 56 when run in the computing system 10. Furthermore, in some embodiments, the memory controller 26 may include an application identifier in the context metadata 58 to indicate the application running on the computing system 10 that resulted in generation of the data block 56 and/or the process expected to target the data block 56 when run in the computing system 10.

To form a data object 52, the memory controller 26 may associate the metadata 54 with the data block 56 (process block 106). For example, the memory controller 26 may generate the data object 52 at least in part by concatenating the metadata 54, including context metadata 58, to the data block 56. In this manner, data may be associated with its context as a data object 52.

As described above, to facilitate improving subsequent data retrieval latency provided by a memory sub-system 14, in some embodiments, a memory controller 26 may predict an upcoming data access pattern based at least in part on context of data stored in and/or to be stored in the memory sub-system 14 and control data storage in the memory sub-system 14 accordingly. For example, when first data previously stored in the memory sub-system 14 is targeted, the memory controller 26 may update data access information 34 associated with the first data and predict that second data previously stored in the memory sub-system 14 will be targeted next, when the second data will next be targeted, and/or when the first data will be targeted again based at least in part on context of the first data and/or context of the second data. The memory controller 26 may then control data storage in the memory sub-system 14 based at least in part on the prediction, for example, by instructing the memory sub-system 14 to adjust the memory level 96 at which an instance (e.g., copy) of the first data and/or the second data is stored.

Additionally or alternatively, the memory controller 26 may predictively control storage of data in the memory sub-system 14 when the data is initially received for storage, for example, by predicting when the data will be targeted next based at least in part on context of the data, context of other data stored in the memory sub-system 14, and/or context of previous memory access requests and, based at least in part on the prediction, selecting a memory level 96 at which to store the data in the memory sub-system 14. To help illustrate, an example of a process 108 for operating a memory sub-system 14 is described in FIG. 10. Generally, the process 108 includes receiving data for storage in a memory sub-system (process block 110), predicting a subsequent data access pattern (process block 112), and controlling storage of data in the memory sub-system based on the predicted subsequent data access pattern (process block 114).

Although described in a particular order, which represents a particular embodiment, it should be noted that the process 108 may be performed in any suitable order. Additionally, embodiments of the process 108 may omit process blocks and/or include additional process blocks. Moreover, in some embodiments, the process 108 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may receive data to be stored in a memory sub-system 14 (process block 110). For example, the memory sub-system 14 may receive the data along with a write memory access request from a processing sub-system 12 via a memory bus 20B. Additionally, in some embodiments, the data to be stored in the memory sub-system 14 may be included in a data block 56 of a data object 52, which includes metadata 54 that indicates context of the data block 56. Furthermore, in response to receiving the data for storage in the memory sub-system 14, the memory controller 26 may determine a predicted data access pattern expected to occur during an upcoming (e.g., subsequent) control horizon (process block 112).

Figure 11:
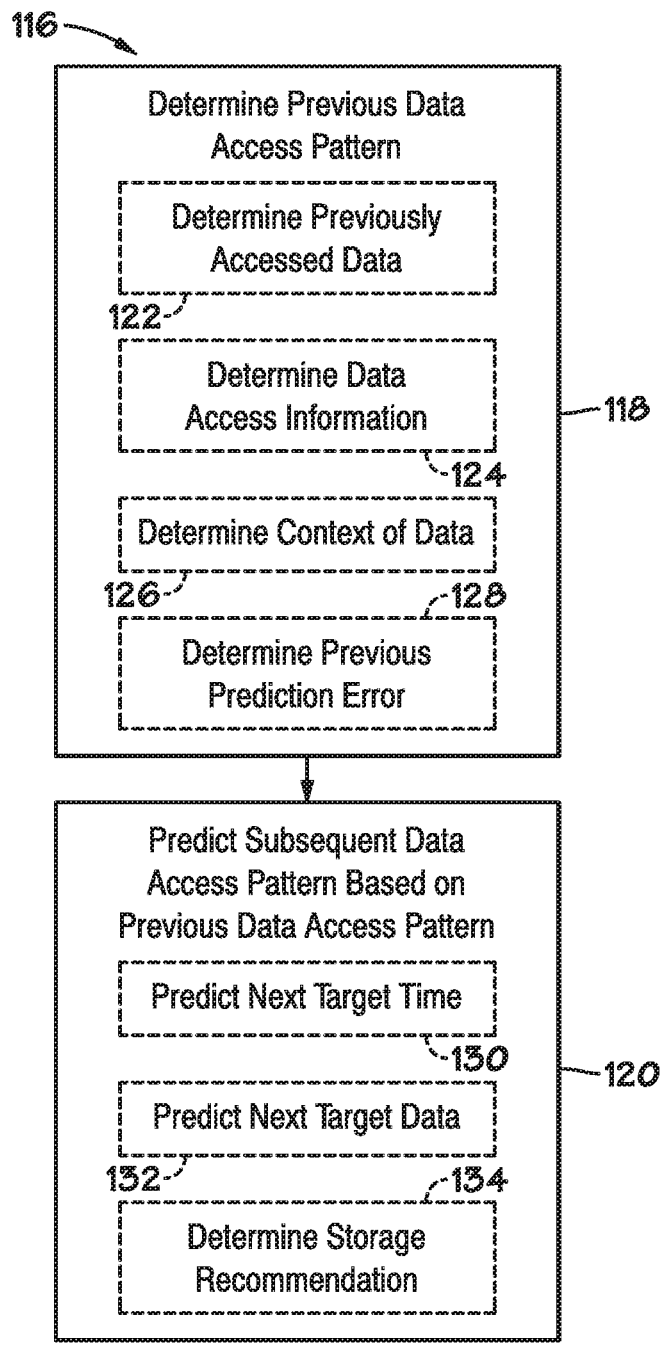
FIG. 11 is a flow diagram of an example process for predicting a subsequent data access pattern, in accordance with an embodiment of the present disclosure.

To help illustrate, an example of a process 116 for determining a predicted data access pattern, which may be used in process block 112, is described in FIG. 11. Generally, the process 116 includes determining a previous data access pattern (process block 118) and predicting a subsequent data access pattern based on the previous data access pattern (process block 120). Although described in a particular order, which represents a particular embodiment, it should be noted that the process 116 may be performed in any suitable order. Additionally, embodiments of the process 116 may omit process blocks and/or include additional process blocks. Moreover, in some embodiments, the process 116 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may determine a previous data access pattern (process block 118). As described above, in some embodiments, input parameters 76 to a machine learning block 32 may be indicative of a previous data access pattern. For example, the input parameters 76 may include a block identifier parameter 86, which identifies one or more previously targeted data blocks 56 (e.g., via tag metadata), a data access information parameter 88, which indicates data access information 34 associated with the one or more previously targeted data blocks 56, a context identifier parameter 90, which indicates one or more context identifiers that indicate context of one or more data blocks 56, and/or a prediction error parameter 92, which indicates error between one or more previously predicted data access patterns and corresponding actual data access patterns.

Thus, in some embodiments, determining the previous data access pattern may include determining previously accessed (e.g., targeted and/or requested) data (process block 122). For example, the memory controller 26 may identify one or more previously accessed data blocks 56 based at least in part on associated tag metadata 57. To facilitate predicting the subsequent data access pattern, in some embodiments, the memory controller 26 may indicate the tag metadata 57 associated with the previously access data blocks 56 via the block identifier parameter 86, which may be input to a machine learning block 32.

Additionally, in some embodiments, determining the previous data access pattern may include determining data access information 34 (process block 124). For example, the memory controller 26 may determine data access information 34 associated with tag metadata 57 that identifies one or more previously access data blocks 56. Additionally or alternatively, the memory controller 26 may determine data access information 34 associated with tag metadata 57 that identifies the data block 56 currently received for storage in the memory sub-system 14. To facilitate predicting the subsequent data access pattern, in some embodiments, the memory controller 26 may indicate data access information 34 associated with relevant (e.g., current and/or one or more previously accessed) data blocks 56 via a data access information parameter 88, which may be input to a machine learning block 32.

Furthermore, in some embodiments, determining the previous data access pattern may include determining context of data (process block 126). For example, the memory controller 26 may determine context of one or more previously accessed data blocks 56 based at least in part on context identifiers indicated in context metadata 58 of one or more corresponding data objects 52. Similarly, when the data block 56 to be stored in the memory sub-system 14 is received as a data object 52, the memory controller 26 may determine context of the data block 56 based at least in part on one or more context identifiers indicated in context metadata 58 of the data object 52. Additionally or alternatively, the memory controller 26 may determine context of the data block 56 to be stored in the memory sub-system 14 based at least in part on context identifiers indicated in a corresponding write memory access request, for example, received from the processing sub-system 12 along with the data block 56. To facilitate predicting the subsequent data access pattern, in some embodiments, the memory controller 26 may indicate context identifiers associated with relevant (e.g., current and/or one or more previously accessed) data blocks 56 via a context identifier parameter 90, which may be input to a machine learning block 32.

Moreover, in some embodiments, determining the previous data access pattern may include determining one or more previous prediction errors (process block 128). For example, the memory controller 26 may determine a prediction error based on difference between a previously predicted next target time of a data block 56 and an actual target time of the data block. Additionally or alternatively, the memory controller 26 may determine a prediction error to indicate whether a predicted next target data block 56 was actually targeted next. To facilitate predicting the subsequent data access pattern, in some embodiments, the memory controller 26 may indicate one or more previous prediction errors via a prediction error parameter 92, which may be input to a machine learning block 32.

Based at least in part on the previous data access pattern, the memory controller 26 may predict a subsequent data access pattern expected to occur during an upcoming control horizon (process block 120). As described above, in some embodiments, output parameters 78 from a machine learning block 32 may be indicative of the predicted data access pattern. For example, the output parameters 78 may include a predicted next target time parameter 80, which indicates when one or more data blocks 56 are next expected to be targeted, a predicted next target data parameter 82, which indicates one or more data block 56 that are expected to be targeted next, and/or a storage recommendation parameter 84, which indicates one or more memory level recommendations and/or one or more flush (e.g., replacement) recommendations.

Thus, in some embodiments, determining the subsequent data access pattern may include determining a predicted next target time of one or more data blocks 56 (process block 130). For example, the memory controller 26 may determine the predicted next target time of a data block 56 by reading a predicted next target time parameter 80 output from a machine learning block 32. Additionally, in some embodiments, determining the subsequent data access pattern may include determining data predicted to be targeted next (process block 132). For example, the memory controller 26 may determine a predicted next target data block 56 by reading a predicted next target data parameter 82 output from a machine learning block 32.

Furthermore, in some embodiments, determining the subsequent data access pattern may include determining one or more storage recommendations (process block 134). For example, the memory controller 26 may determine a storage recommendation by reading a storage recommendation parameter 84 output from a machine learning block 32. In some embodiments, a storage recommendation may indicate a recommended memory level at which to store a data block 56. Additionally or alternatively, since storage capacity of a lower memory level is generally limited, in some embodiments, a storage recommendation may indicate one or more other data blocks 56 recommended to be flushed (e.g., replaced) from the lower memory level to make room for subsequent storage of one or more data blocks 56 therein. In this manner, a subsequent data access pattern expected to occur during an upcoming control horizon may be predicted.

Figure 12:
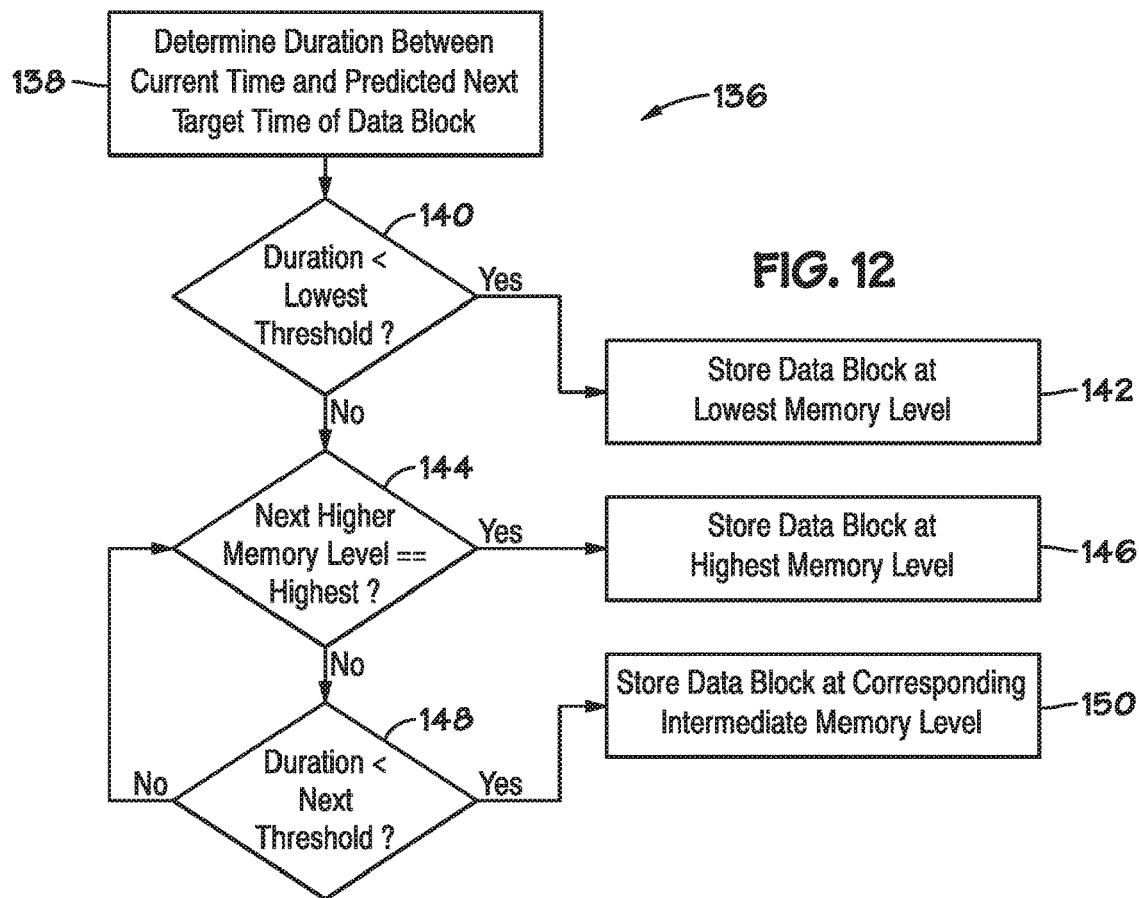
FIG. 12 is a flow diagram of an example process for predictively controlling storage of data to be stored in the memory sub-system of FIG. 1, in accordance with an embodiment of the present disclosure.

Returning to the process 108 of FIG. 10, based at least in part on the predicted subsequent data access pattern, the memory controller 26 may control storage of the data in the memory sub-system 14 (process block 114). To help illustrate, an example of a process 136 for predictively controlling storage of data received for storage in a memory sub-system 14 is described in FIG. 12. Generally, the process 136 includes determining duration between a current time and a predicted next target time of a data block (process block 138), determining whether the duration is less than a lowest duration threshold (decision block 140), and storing the data block at a lowest memory level when the duration is less than the lowest duration threshold (process block 142). When the duration is not less than the lowest duration threshold, the process 136 includes determining whether a next higher memory level is a highest memory level (decision block 144) and storing the data block at the highest memory level when the next higher memory level is the highest memory level (process block 146). When the next higher memory is not the highest memory level, the process 136 includes determining whether the duration is less than a next higher duration threshold (decision block 148) and storing the data block at a corresponding intermediate memory level when the duration is less than the next duration threshold (process block 150).

Although described in a particular order, which represents a particular embodiment, it should be noted that the process 136 may be performed in any suitable order. Additionally, embodiments of the process 136 may omit process blocks and/or include additional process blocks. Moreover, in some embodiments, the process 136 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may determine duration between a current time and a predicted next target time of a data block 56 received for storage in a memory sub-system 14 (process block 138). As described above, in some embodiments, a memory controller 26 may determine a predicted next target time of a data block 56 by reading a predicted next target time parameter 80 output from a machine learning block 32. Additionally, the memory controller 26 may determine the duration based at least in part on the difference between the current time and the predicted next target time of the data block 56.

As described above, in some embodiments, a memory sub-system 14 may be implemented using multiple hierarchical memory levels. For example, the memory sub-system 14 may include a lowest memory level 96 implemented using one or more processor-side (e.g., L1) caches 24B and a highest memory level 96 implemented using a memory array 28 in one or more non-volatile memory devices 18B. Additionally, in some embodiments, the memory sub-system 14 may include one or more intermediate memory levels 96 between the lowest memory level 96 and the highest memory level. For example, the memory sub-system 14 may include a first intermediate memory level 96 implemented using another one or more processor-side (e.g., L2) caches 24B, a second intermediate memory level 96 (e.g., higher than first intermediate memory level 96) implemented using another one or more processor-side (e.g., L3) caches 24B, a third intermediate memory level 96 (e.g., higher than second intermediate memory level 96) implemented using one or more memory-side caches 24A, and/or a fourth intermediate memory level 96 (e.g., higher than third intermediate memory level 96) implemented using a memory array 28 in one or more volatile memory devices 18A.

To facilitate predictively controlling data storage, in some embodiments, each memory level 96 implemented in a memory sub-system 14 may be associated with a corresponding duration threshold. For example, the lowest memory level 96 may be associated with a lowest duration threshold of one nanosecond and/or the highest memory level 96 may be associated with a highest duration threshold of one thousand nanoseconds. Additionally, the first intermediate memory level 96 may be associated with a first intermediate duration threshold of five nanoseconds, the second intermediate memory level 96 may be associated with a second intermediate duration threshold of twenty nanoseconds, the third intermediate memory level 96 may be associated with a third intermediate duration threshold of fifty nanoseconds, and/or the fourth intermediate memory level 96 may be associated with a fourth intermediate duration threshold of one hundred nanoseconds.

As such, the memory controller 26 may then determine whether the duration between the current time and the predicted next target time is less than a lowest duration threshold associated with the lowest memory level 96 (decision block 140). For example, the memory controller 26 may determine whether the duration between the current time and the predicted next target time is less than one nanosecond. Additionally, when the duration is less than the lowest duration threshold, the memory controller 26 may instruct the memory sub-system 14 to store the data block 56 in the lowest memory level 96 (process block 142)

On the other hand, when the duration between the current time and the predicted next target time is not less than the lowest duration threshold, the memory controller 26 may determine whether a next higher memory level 96 is a highest memory level 96 (decision block 144). For example, the memory controller 26 may determine whether the next higher memory level 96 is a memory level 96 implemented by a memory array 28 in one or more non-volatile memory devices 18B. Additionally, when the next higher memory level 96 is the highest memory level 96, the memory controller 26 may instruct the memory sub-system 14 to store the data block at the highest memory level 96 (process block 146).

When the next higher memory level 96 is not the highest memory level 96, the memory controller 26 may determine whether the duration between the current time and the predicted next target time is less than a next duration threshold associated with the next higher memory level 96 (decision block 148). For example, when the duration between the current time and the predicted next target time is not less than the lowest duration threshold, the memory controller 26 may determine whether the duration is less than the first intermediate duration threshold associated with the first intermediate memory level 96. Similarly, when the duration between the current time and the predicted next target time is not less than the first intermediate duration threshold, the memory controller 26 may determine whether the duration is less than the second intermediate duration threshold associated with the second intermediate memory level 96, and so on.

Additionally, when the duration is less than the next duration threshold, the memory controller 26 may instruct the memory sub-system 14 to store the data block 56 at an intermediate memory level 96 corresponding with the next duration threshold (process block 150). For example, when the duration between the current time and the predicted next target time is less than the first intermediate duration threshold, but not less than the lowest duration threshold, the memory controller 26 may instruct the memory sub-system 14 to store the data block 56 at the first intermediate memory level 96 associated with the first intermediate duration threshold. Similarly, when the duration between the current time and the predicted next target time is less than the second intermediate duration threshold, but not less than the first intermediate duration threshold, the memory controller 26 may instruct the memory sub-system 14 to store the data block 56 at the second intermediate memory level 96 associated with the second intermediate duration threshold, and so on.

When a lower memory level 96 is selected, in some embodiments, the memory controller 26 may instruct the memory sub-system 14 to also store an instance of the data block 56 in a higher (e.g., highest) memory level 96, for example, since the lower memory level 96 may lack data persistence in the absence of power and/or since the data block 56 may subsequently be flushed (e.g., replaced) from the lower memory level 96 to make room for other data. In other words, in such embodiments, the memory controller 26 may instruct the memory sub-system 14 to store the same data in multiple different memory levels 96. For example, the memory controller 26 may instruct the memory sub-system 14 to store the data block 56 at a highest memory level 96 implemented by a memory array 28 in one or more non-volatile memory devices 18B and a lower memory level 96 implemented by a processor-side cache 24B, a memory-side cache 24A, and/or a memory array 28 in one or more volatile memory devices 18A.

Moreover, as described above, in some embodiments, a memory sub-system 14 may include a memory-side memory sub-system 14A and a processor-side memory sub-system 14B. Additionally, as described above, in some embodiments, a memory level 96 implemented in the processor-side memory sub-system 14B may be lower than a memory level 96 implemented. In other words, in such embodiments, a highest (e.g., L3) memory level 96 implemented in the processor-side memory sub-system 14B may nevertheless be lower than a lowest memory level 96 implemented in the memory-side memory sub-system 14A.

Accordingly, in some embodiments, one or more memory controllers 26 implemented in the memory sub-system 14 may determine whether to store an instance of the data block 56 in the processor-side memory sub-system 14B based at least in part on a duration threshold associated with the highest memory level 96 implemented in the processor-side memory sub-system 14B. For example, when the duration between the current time and the predicted next target time of the data block 56 is less than the duration threshold associated with highest memory level 96 implemented in a processor-side memory sub-system 14B, a processor-side memory controller 26A may instruct the processor-side memory sub-system 14B to store an instance of the data block 56 in one or more memory levels 96 implemented in the processor-side memory sub-system 14B. As described above, in some embodiments, one or more instances of the data block 56 may nevertheless be stored in the memory-side memory sub-system 14A.

To facilitate storing the data block 56 in the memory-side memory sub-system 14A, in some embodiments, the processor-side memory sub-system 14B may output the data block 56 to the memory-side memory sub-system 14A, for example, via a memory bus 20B along with a write memory access request received from the processing sub-system 12 and/or a predicted data access pattern. In response, as described above, a memory-side memory controller 26A may instruct the memory-side memory sub-system 14A to store an instance of the data block 56 in one or more memory levels 96 implemented in the memory-side memory sub-system 14A, for example, by comparing duration between the current time and the predicted next target time with duration thresholds associated with memory level 96 implemented in the memory-side memory sub-system 14A. To facilitate improving operational efficiency, in some embodiments, the memory-side memory controller 26A may simply instruct the memory-side memory sub-system 14A to store the data block 56 in its highest memory level 96 when an instance of the data block 56 is already stored in the processor-side memory sub-system 14B, thereby obviating comparisons that would otherwise be performed by the memory-side memory controller 26A. In this manner, a memory sub-system 14 may predictively control data storage when data is received for storage therein.

Additionally or alternatively, a memory sub-system 14 may predictively control (e.g., adjust) data storage when a computing system 10 accesses (e.g., targets and/or requests) data previously stored in the memory sub-system 14. To help illustrate, an example of a process 152 for operating a computing system 10 is described in FIG. 13. Generally, the process 152 includes determining data targeted by processing circuitry (process block 154) and determining whether the target data results in a register miss (decision block 156). When the target data results in a register miss, the process 152 includes requesting the target data from a processor-side memory sub-system (process block 158), determining whether the target data results in a processor-side miss (decision block 160), and requesting the target data from a memory-side memory sub-system when the target data results in a processor-side miss (process block 162). Additionally, the process 152 includes supplying the target data to the processing circuitry (process block 166), predicting a subsequent data access pattern (process block 168), and controlling data storage in a memory sub-system based on the predicted subsequent data access pattern (process block 170).

Although described in a particular order, which represents a particular embodiment, it should be noted that the process 152 may be performed in any suitable order. Additionally, embodiments of the process 152 may omit process blocks and/or include additional process blocks. Moreover, in some embodiments, the process 152 may be implemented at least in part by executing instructions stored in a tangible, non-transitory, computer-readable medium, such as memory implemented in a memory controller 26 and/or a processing sub-system 12, using processing circuitry, such as a processor implemented in the memory controller 26 and/or the processing sub-system 12.

Accordingly, in some embodiments, a processing sub-system 12 may determine data targeted by its processing circuitry 16, for example, for processing and/or execution (process block 154). To facilitate locating a target data block 56, the processing sub-system 12 may determine a target tag value (e.g., tag metadata 57) expected to be associated with and, thus, identify the target data block 56. For example, the processing sub-system 12 may determine the target tag value based at least in part on a target virtual memory address used by the processing sub-system 12 to identify the target data block 56 and/or a target physical memory address at which the target data block 56 is expected to be stored in a memory sub-system 14.

Accordingly, based at least in part on the target tag value, the processing sub-system 12 may determine whether the target data is currently stored in a register 22 of the processing sub-system 12 and, thus, whether the target data results in a register miss (decision block 156). For example, the processing sub-system 12 may search tag metadata 57 associated with valid data blocks 56 currently stored in the registers 22 based at least in part on the target tag value expected to be associated with the target data block 56. In particular, when a match is identified in the registers 22, the processing sub-system 12 may determine that the target data does not result in a register miss and, thus, supply the target data from the registers 22 to its processing circuitry 16 (process block 166).

On the other hand, when the target tag value is not included in any of the registers 22, the processing sub-system 12 may determine that the target data results in a register miss and, thus, request the target data from a processor-side memory sub-system 14B (process block 158). As described above, a processing sub-system 12 may request access to a memory sub-system 14 by outputting a memory access request to the memory sub-system 14. For example, to store (e.g., write) data in the memory sub-system 14, the processing sub-system 12 may output the data along with a write memory access request to the memory sub-system 14. Additionally or alternatively, the processing sub-system 12 may retrieve (e.g., read) data previously stored in the memory sub-system 14 by outputting a read memory access request to the memory sub-system 14.

To help illustrate, an example of a process 172 for generating a memory access request is described in FIG. 14. Generally, the process 172 includes determining access parameters to be used to access data (process block 174), determining context of the data (process block 176), and determining a memory access request to indicate the access parameters and the context (process block 178). Although described in a particular order, which represents a particular embodiment, it should be noted that the process 172 may be performed in any suitable order. Additionally, embodiments of the process 172 may omit process blocks and/or include additional process blocks. Moreover, in some embodiments, the process 172 may be implemented at least in part by executing instructions stored in a tangible, non-transitory, computer-readable medium, such as memory implemented in a memory controller 26 and/or a processing sub-system 12, using processing circuitry, such as a processor implemented in the memory controller 26 and/or the processing sub-system 12.

Accordingly, in some embodiments, a processing sub-system 12 may determine access parameters to be used to access data (process block 174). In some embodiments, determining the access parameters may include determining a memory address associated with the data (process block 180). For example, when a data block 56 is to be stored in a memory sub-system 14, write access parameters may include a virtual memory address used by processing circuitry 16 to identify the data block 56 and/or a physical memory address in the memory sub-system 14 at which to store the data block 56. Additionally or alternatively, when a data block 56 is to be retrieved from a memory sub-system 14, read access parameters may include a virtual memory address used by processing circuitry 16 to identify the data block 56 and/or a physical memory address in the memory sub-system 14 at which the data block 56 is expected to be stored. In some embodiments, the processing sub-system 12 may also determine a tag value (e.g., tag metadata 57) associated with the data based at least in part on the memory address.

Additionally, in some embodiments, determining the access parameters may include determining size (e.g., bit depth) of the data (process block 182). For example, when a data block 56 is to be stored in a memory sub-system 14, write access parameters may indicate size of the data block 56 and/or size of a data object 52 including the data block 56. Additionally or alternatively, when a data block 56 is to be retrieved from a memory sub-system 14, read access parameters may indicate expected size of the data block 56 and/or expected size of a data object 52 including the data block 56.

Furthermore, in some embodiments, determining the access parameters may include determining an access type (process block 184). For example, when a data block 56 is to be stored in a memory sub-system 14, write access parameters may include a write enable indicator (e.g., bit). Additionally or alternatively, when a data block 56 is to be retrieved from a memory sub-system 14, read access parameters may include a read enable indicator (e.g., bit).

To facilitate predictively controlling data storage in the memory sub-system 14, the processing sub-system 12 may determine context of the data to be stored in and/or retrieved from the memory sub-system 14 (process block 176). As described above, in some embodiments, context of a data block 56 may include the type of data included in the data block 56. For example, the processing sub-system 12 may analyze the data block 56 to determine whether the data block 56 includes image data, virtual machine data, executable instructions, audio data, or any combination thereof. Additionally or alternatively, the processing sub-system 12 may receive an indication of the type of data included in the data block 56, for example, from a different computing sub-system and/or via a user input.

As described above, in some embodiments, context of a data block 56 may additionally or alternatively include aspects of a computing system 10 associated with the data block 56. For example, to determine context of the data block 56, the processing sub-system 12 may identify a process running on the computing system 10 that resulted in generation of the data block 56, an application running on the computing system 10 that resulted in generation of the data block 56, a processor thread that generated the data block 56, a user of the computing system 10 for which the data block 56 was generated, and/or a virtual machine that resulted in generation of the data block 56. Additionally or alternatively, the processing sub-system 12 may identify a process expected to target the data block 56 when run in the computing system 10, a processor thread expected to target the data block 56, a processor core 94 expected to target the data block 56, a user of the computing system 10 for which the data block 56 is expected to be targeted, and/or a virtual machine expected to target the data block 56 when run in the computing system 10.

The processing sub-system 12 may then generate and output a memory access request that indicates the access parameters and the context of the data to be stored in and/or retrieved from the memory sub-system 14 (process block 178). For example, when a data block 56 is to be stored in a memory sub-system 14, the processing sub-system 12 may generate and output a write memory access request indicating the write access parameters and one or more context identifiers associated with the data block 56. Additionally or alternatively, when a data block 56 is to be retrieved from a memory sub-system 14, the processing sub-system 12 may generate and output a read memory access request indicating the read access parameters and one or more context identifiers associated with the data block 56. In this manner, a processing sub-system 12 may request access to a memory sub-system 14, for example, to request storage of data and/or return (e.g., retrieval) of data previously stored in the memory sub-system 14.

Figure 13:
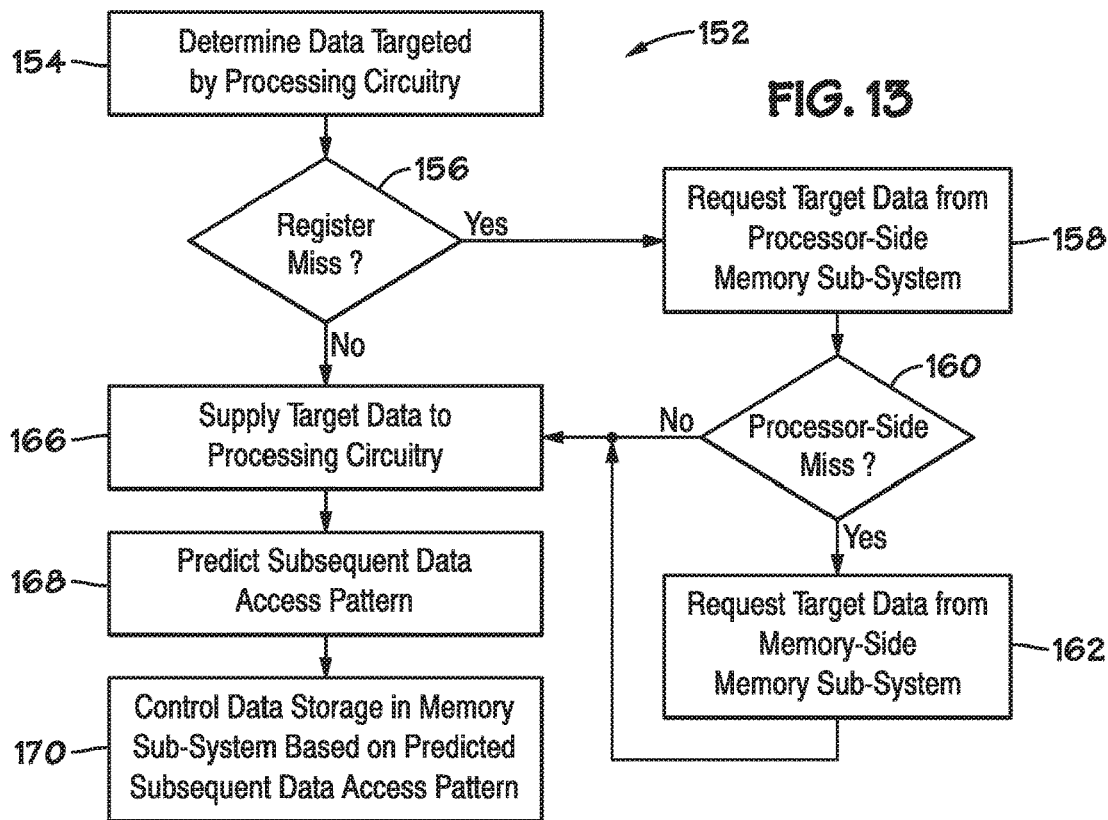
FIG. 13 is a flow diagram of an example process for operating the computing system of FIG. 1, in accordance with an embodiment of the present disclosure.

Returning to the process 152 of FIG. 13, based at least in part on the read memory access request received from the processing sub-system 12, a processor-side memory controller 26B may determine whether the target data is currently stored in a processor-side cache 24B and, thus, whether the target data results in a processor-side cache miss (decision block 160). For example, the processor-side memory controller 26B may search tag metadata 57 associated with valid data blocks 56 currently stored in one or more processor-side caches 24B based at least in part on the target tag value (e.g., tag metadata 57) expected to be associated with the target data block 56. In particular, when the target tag value is included in a processor-side cache 24B, the processor-side memory controller 26B may determine that the target data does not result in a processor-side miss and, thus, instruct the processor-side caches 24B to supply the target data to the processing circuitry 16 of the processing sub-system 12 (process block 166).

On the other hand, when the target tag value is not included in any of the processor-side caches 24B, the processor-side memory controller 26B may determine that the target data results in a processor-side miss and, thus, request the target data from a memory-side memory sub-system 14A (process block 162). In some embodiments, the processor-side memory controller 26B may request the target data from the memory-side memory sub-system 14A by forwarding the read memory access request received from the processing sub-system 12 to the memory-side memory sub-system 14A, for example, via a memory bus 20B. Based at least in part on the read memory access request, a memory-side memory controller 26A may locate the target data and instruct the memory-side memory sub-system 14A to output the target data, for example, to the processing sub-system 12 and/or the processor-side memory sub-system 14B via the memory bus 20B (process block 166).

As described above, in some embodiments, a memory-side memory sub-system 14A may include one or more memory-side caches 24A used to implement a lower memory level compared to a memory array 28 implemented in one or more memory devices 18 in the memory-side memory sub-system 14A. Accordingly, when the memory-side memory sub-system 14A includes memory-side caches 24A, the memory-side memory controller 26A may determine whether the target data is currently stored in the memory-side caches 24A and, thus, whether the target data results in a memory-side cache miss. For example, the memory-side memory controller 26A may search tag metadata 57 associated with valid data blocks 56 currently stored in the memory-side caches 24A based at least in part on the target tag value (e.g., tag metadata 57) expected to be associated with the target data block 56. In particular, when the target tag value is included in the memory-side caches 24A, the memory-side memory controller 26A may determine that the target data does not result in a memory-side cache miss and, thus, instruct the one or more memory-side caches 24A to output the target data.

When the target data results in a memory-side cache miss or a memory-side memory sub-system 14A does not include memory-side caches 24A, the memory-side memory controller 26A may locate the target data in a memory array 28 implemented in one or more memory devices 18 and instruct the memory array 28 to output the target data. For example, the memory-side memory controller 26A may instruct row select circuitry 36 to activate a memory cell row 48 of a memory array 28 in which the target data is stored. In some embodiments, the row select circuitry 36 may activate the memory cell row 48 identified by a row address associated with the target data. Additionally, in some embodiments, the row select circuitry 36 may activate the memory cell row 48 by outputting an activation (e.g., logic high) signal to a word line 42 coupled to the memory cells 40 of the memory cell row 48. Furthermore, in some embodiments, column select circuitry 38 may read the target data from the activated memory cell row 48 by selecting amplifier circuitry 44 coupled to a memory cell column 50 identified by a column address associated with the target data. Additionally or alternatively, the column select circuitry 38 may mux outputs from each memory cell column 50 based on the column address associated with the target data.

To facilitate improving subsequent data retrieval latency, in some embodiments, a memory sub-system 14 may store an instance (e.g., copy) of target data retrieved from a higher memory level 96 in a lower memory level 96. For example, when target data is retrieved from the memory array 28, the memory-side memory controller 26A may instruct the memory-side memory sub-system 14A to store an instance of the target data in one or more memory-side caches 24A. Additionally or alternatively, when target data is retrieved from the memory-side memory sub-system 14A, the processor-side memory controller 26B may instruct the processor-side memory sub-system 14B to store an instance of the target data in one or more processor-side caches 24B.

In any case, after the target data is supplied to the processing circuitry 16, the memory-side memory controller 26A and/or the processor-side memory controller 26B may predict a subsequent data access pattern expected to occur during an upcoming control horizon (process block 168). As described above, in some embodiments, a memory controller 26 may predict a subsequent data access pattern using the process 116 described in FIG. 11. Additionally, based at least in part on the predicted subsequent data access pattern, the memory-side memory controller 26A may predictively control data storage in the memory-side memory sub-system 14A and the processor-side memory controller 26B may predictively control data storage in the processor-side memory sub-system 14B.

Figure 15:
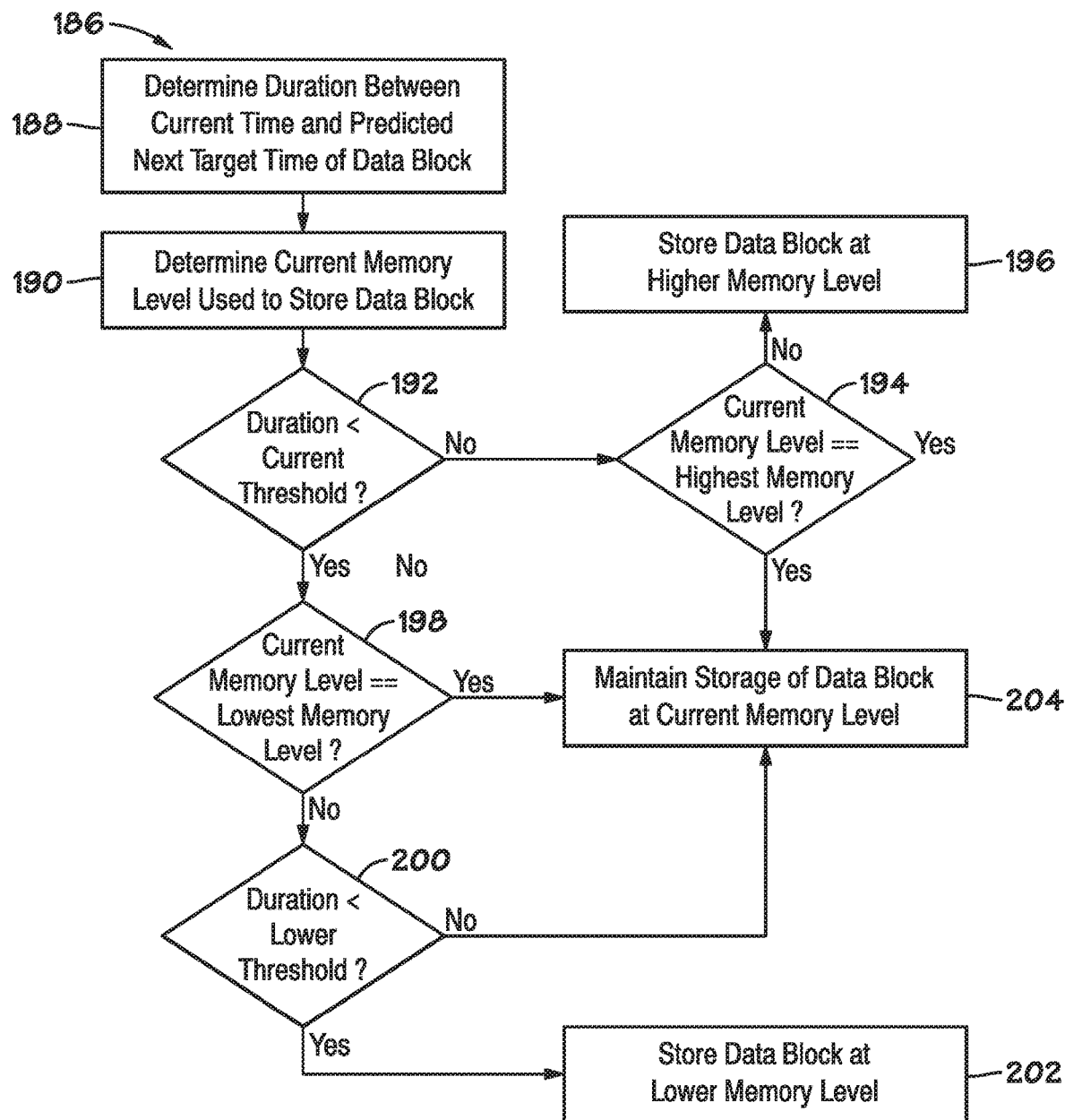
FIG. 15 is a flow diagram of an example process for predictively controlling storage of data in the memory sub-system of FIG. 1, in accordance with an embodiment of the present disclosure.

To help illustrate, an example of a process 186 for predictively controlling storage of data previously stored in a memory sub-system 14 is described in FIG. 15. Generally, the process 186 includes determining duration between a current time and a predicted next target time of a data block (process block 188), determining a current memory level used to store the data block (process block 190), determining whether the duration is less than a current duration threshold (decision block 192), determining whether the current memory level is a highest memory level when the duration is not less than the current duration threshold (decision block 194), and storing the data block at a higher memory level when the current memory level is not the highest memory level (process block 196). When the duration is less than the current duration threshold, the process 186 includes determining whether the current memory level is a lowest memory level (decision block 198), determining whether the duration is less than a lower duration threshold when the current memory level is not the lowest memory level (decision block 200), and storing the data block at a lower memory level when the duration is less than the lower duration threshold (process block 202). Additionally, the process 186 includes maintaining storage of the data block at the current memory level when the duration is not less than the current duration threshold and the current memory level is the highest memory level, when the duration is less than the current duration threshold and the current memory level is the lowest memory level, or when the duration is less than current duration threshold and the duration is not less than the lower duration threshold (process block 204).

Although described in a particular order, which represents a particular embodiment, it should be noted that the process 186 may be performed in any suitable order. Additionally, embodiments of the process 186 may omit process blocks and/or include additional process blocks. Moreover, in some embodiments, the process 186 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may determine the duration between a current time and a predicted next target time of a data block 56 previously stored in a memory sub-system 14 (process block 188). As described above, in some embodiments, a memory controller 26 may determine a predicted next target time of a data block 56 by reading a predicted next target time parameter 80 output from a machine learning block 32. Additionally, the memory controller 26 may determine the duration based at least in part on the difference between the current time and the predicted next target time of the data block 56.

As described above, in some embodiments, a memory sub-system 14 may be implemented using multiple hierarchical memory levels. Additionally, as described above, in some embodiments, each memory level 96 implemented in a memory sub-system 14 may be associated with a corresponding duration threshold. For example, a lowest memory level 96 may be associated with a lowest duration threshold of one nanosecond and/or a highest memory level 96 may be associated with a highest duration threshold of one thousand nanoseconds. Additionally, a first intermediate memory level 96 may be associated with a first intermediate duration threshold of five nanoseconds, a second intermediate memory level 96 may be associated with a second intermediate duration threshold of twenty nanoseconds, a third intermediate memory level 96 may be associated with a third intermediate duration threshold of fifty nanoseconds, and/or a fourth intermediate memory level 96 may be associated with a fourth intermediate duration threshold of one hundred nanoseconds.

Furthermore, the memory controller 26 may determine a current memory level used to store the data block 56 (process block 190) and whether the duration between the current time and the predicted next target time is less than a current duration threshold associated with the current memory level (decision block 192). For example, when the current memory level 96 is the highest memory level 96, the memory controller 26 may determine whether the duration is less than the highest duration threshold of one thousand nanoseconds. Additionally, when the current memory level 96 is the lowest memory level 96, the memory controller 26 may determine whether the duration is less than the lowest duration threshold of one nanosecond. Furthermore, when the current memory level 96 is the fourth intermediate memory level 96, the memory controller 26 may determine whether the duration is less than the fourth intermediate duration threshold of one hundred nanoseconds, and so on.

When the duration between the current time and the predicted next target time is not less than the current duration threshold, the memory controller 26 may determine whether the current memory level 96 at which the data block 56 is stored is the highest memory level 96 (decision block 194). In other words, in some embodiments, the memory controller 26 may determine whether the current memory level 96 is implemented using a memory array 28 in one or more non-volatile memory devices 18B. For example, the memory controller 26 may determine that the current memory level 96 is the highest memory level 96 when the current memory level 96 is implemented using a memory array 28 in one or more non-volatile memory devices 18B. On the other hand, the memory controller 26 may determine that the current memory level 96 is not the highest memory level 96 when the current memory level 96 is not implemented using a memory array 28 in one or more non-volatile memory devices 18B.

Additionally, when the current memory level 96 is not the highest memory level 96, the memory controller 26 may instruct the memory sub-system 14 to store the data block 56 at a higher memory level (process block 196). For example, when the data block 56 is currently stored in the fourth intermediate memory level 96 and the duration is not less than the fourth intermediate duration threshold, the memory controller 26 may instruct the memory sub-system 14 to store the data block 56 at the highest memory level 96. Similarly, when the data block 56 is currently stored in the lowest intermediate memory level 96 and the duration is not less than the lowest duration threshold, the memory controller 26 may instruct the memory sub-system 14 to store the data block 56 at the first intermediate memory level 96, and so on. On the other hand, when the current memory level 96 is the highest memory level 96, the memory controller 26 may instruct the memory sub-system 14 to maintain storage of the data block 56 in the highest memory level 96 (process block 204).

When the duration between the current time and the predicted next target time is less than the current duration threshold, the memory controller 26 may determine whether the current memory level 96 at which the data block 56 is stored is the lowest memory level 96 (decision block 198). In other words, in some embodiments, the memory controller 26 may determine whether the current memory level 96 is implemented using one or more L1 processor-side caches 24B. For example, the memory controller 26 may determine that the current memory level 96 is the lowest memory level 96 when the current memory level 96 is implemented using one or more L1 processor-side caches 24B. On the other hand, the memory controller 26 may determine that the current memory level 96 is not the lowest memory level 96 when the current memory level 96 is not implemented using one or more L1 processor-side caches 24B.

Additionally, when the current memory level 96 is not the lowest memory level 96, the memory controller 26 may determine whether the duration between the current time and the predicted next target time is less than a lower duration threshold associated with a next lower memory level 96 (decision block 200). For example, when the data block 56 is currently stored in the fourth intermediate memory level 96 and the duration is less than the fourth intermediate duration threshold, the memory controller 26 may determine whether the duration is less than a third intermediate duration threshold associated with the third intermediate memory level 96. Similarly, when the data block 56 is currently stored in the highest memory level and the duration is less than the highest duration threshold, the memory controller 26 may determine whether the duration is less than the fourth intermediate duration threshold associated with the fourth intermediate memory level 96, and so on. On the other hand, when the duration is less than the current duration threshold and the current memory level 96 is the lowest memory level 96, the memory controller 26 may instruct the memory sub-system 14 to maintain storage of the data block 56 at the lowest memory level 96 (process block 204).

When the duration between the current time and the predicted next target time is less than the lower duration threshold, the memory controller 26 may instruct the memory sub-system 14 to store the data block 56 at a lower memory level (process block 202). For example, when the data block 56 is currently stored in the fourth intermediate memory level 96 and the duration is less than the third intermediate duration threshold, the memory controller 26 may instruct the memory sub-system 14 to adjust data storage such that the data block 56 is stored at the third intermediate memory level 96. Similarly, when the data block 56 is currently stored in the highest memory level and the duration is less than the fourth intermediate duration threshold, the memory controller 26 may instruct the memory sub-system 14 to adjust data storage such that the data block is stored at the fourth intermediate memory level 96, and so on. On the other hand, when the duration is less than the current duration threshold and not less than the lower duration threshold, the memory controller 26 may instruct the memory sub-system 14 to maintain storage of the data block 56 at the current memory level 96 (process block 204).

In this manner, a memory controller 26 may predictively control (e.g., adjust) storage of data previously stored in a memory sub-system 14 based at least in part on when the data is predicted to be targeted next. As described above, in some embodiments, a predicted next target time of data and/or predicted next target data may be indicative of a predicted data access pattern expected to occur during an upcoming control horizon. Accordingly, in some embodiments, a memory controller 26 may additionally or alternatively predictively control storage of data previously stored in a memory sub-system 14 based at least in part on what data is predicted to be targeted next.

Figure 16:
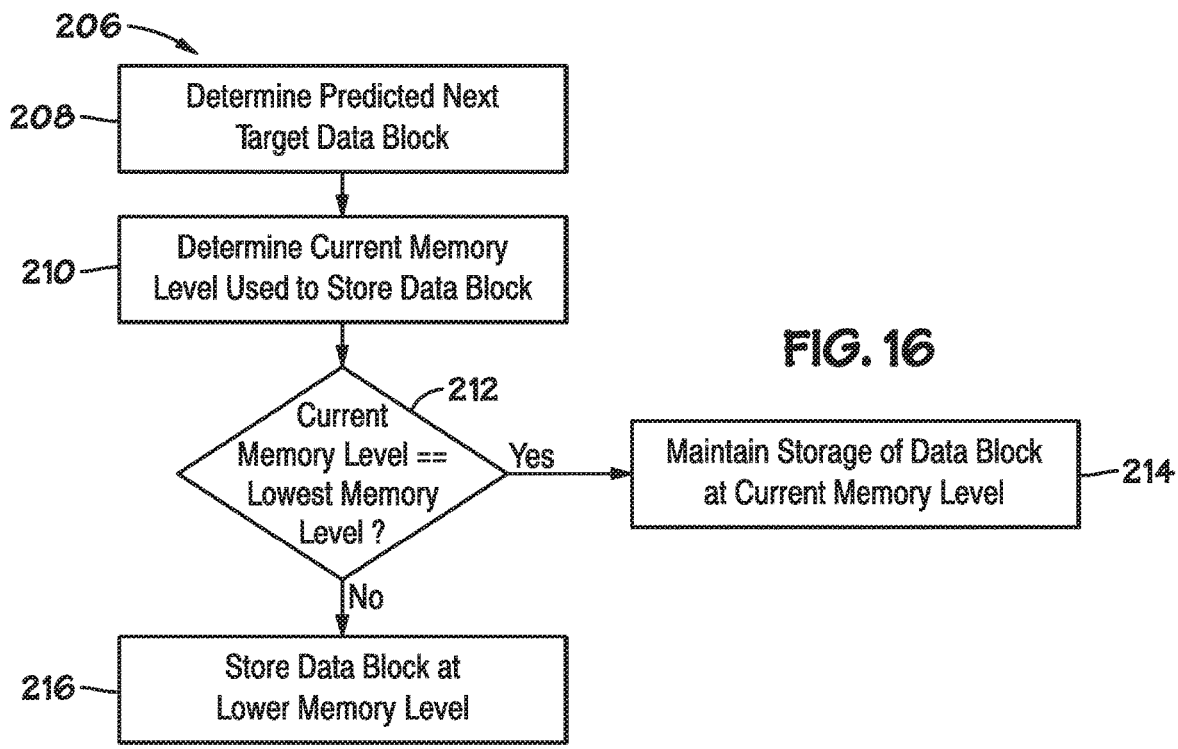
FIG. 16 is a flow diagram of another example process for predictively controlling storage of data previously stored in the memory sub-system of FIG. 1, in accordance with an embodiment of the present disclosure.

To help illustrate, an example of a process 206 for predictively controlling data storage based on a prediction of next target data is described in FIG. 16. Generally, the process 206 includes determining a predicted next target data block (process block 208), determining a current memory level used to store the data block (process block 210), and determining whether the current memory level is a lowest memory level (decision block 212). Additionally, the process 206 includes maintaining storage of the data block at the current memory level when the current memory level is the lowest memory level (process block 214) and storing the data block at a lower memory level when the current memory level is not the lowest memory level (process block 216).

Although described in a particular order, which represents a particular embodiment, it should be noted that the process 206 may be performed in any suitable order. Additionally, embodiments of the process 206 may omit process blocks and/or include additional process blocks. Moreover, in some embodiments, the process 206 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may determine a data block 56 predicted to be targeted next (process block 208). For example, the memory controller 26 may determine a predicted next target data block 56 by reading a predicted next target data parameter 82 output from a machine learning block 32. Additionally, the memory controller 26 may determine a current memory level 96 used to store the predicted next target data block 56 (process block 210).

Furthermore, the memory controller may determine whether the current memory level 96 is a lowest memory level (decision block 212). In other words, in some embodiments, the memory controller 26 may determine whether the current memory level 96 is implemented using one or more L1 processor-side caches 24B. For example, the memory controller 26 may determine that the current memory level 96 is not the lowest memory level 96 when the current memory level 96 is not implemented using one or more L1 processor-side caches 24B. On the other hand, the memory controller 26 may determine that the current memory level 96 is the lowest memory level 96 when the current memory level 96 is implemented using one or more L1 processor-side caches 24B.

When the predicted next target data block 56 is currently stored in the lowest memory level 96, the memory controller 26 may determine that storage of the predicted next target data block 56 is already optimized (e.g., to facilitate improving data retrieval latency) and, thus, instruct the memory sub-system 14 to maintain storage of the predicted next target block 56 at the lowest memory level 96 (process block 214). On the other hand, when the predicted next target data block 56 is not currently stored in the lowest memory level 96, the memory controller 26 may instruct the memory sub-system 14 to adjust storage of the predicted next target data block 56 such that the predicted next target data block 56 is stored at a lower memory level 96. For example, when the predicted next target block 56 is currently stored in the fourth intermediate memory level 96, the memory controller 26 may instruct the memory sub-system 14 to store an instance of the predicted next target block 56 in the third intermediate memory level 96. Additionally or alternatively, the memory controller 26 may instruct the memory sub-system 14 to store an instance of the predicted next target block 56 in the lowest memory level 96. In this manner, a memory controller 26 may predictively control storage of data previously stored in a memory sub-system 14 based at least in part on a prediction of what data will be targeted next, for example, indicated by an output parameter 78 of a machine learning block 32.

As described above, in some embodiments, a machine learning block 32 may additionally or alternatively output one or more storage recommendations. For example, a storage recommendation may indicate a recommended memory level at which to store a data block 56. Since storage capacity of a lower memory level is generally limited, in some embodiments, a storage recommendation may additionally recommend one or more other data blocks 56 to flush (e.g., replace) from the lower memory level to make room for subsequent storage of one or more other data blocks 56 therein.

However, at least in some instances, a memory level may be unable to simultaneously (e.g., concurrently) read data from the memory level and write data to the memory level 96. In other words, at least in some instances, implementing the flush recommendation may delay when data can be read from and/or written to the current memory level 96. Moreover, at least in some instances, implementing the flush recommendation may consume electrical power. Accordingly, in some embodiments, flush recommendations may be selectively implemented to facilitate improving data retrieval latency and/or operational efficiency of a memory sub-system 14 and, thus, a computing system 10 in which the memory sub-system is implemented.

Figure 17:
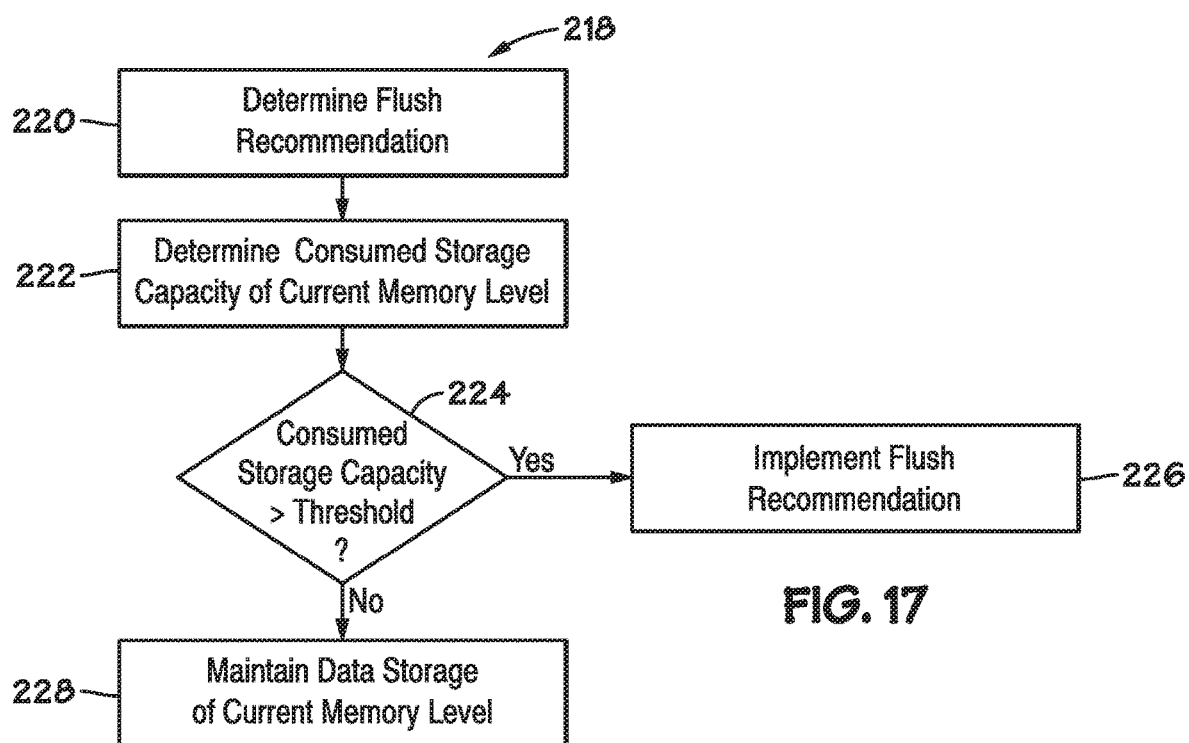
FIG. 17 is a flow diagram of another example process for predictively controlling storage of data previously stored in the memory sub-system of FIG. 1, in accordance with an embodiment of the present disclosure.

To help illustrate, an example of a process 218 for selectively implementing a flush (e.g., replace) recommendation is described in FIG. 17. Generally, the process 218 includes determining a flush recommendation (process block 220), determining consumed storage capacity of a current memory level (process block 222), determining whether the consumed storage capacity is greater than a capacity threshold (decision block 224). Additionally, the process 218 includes implementing the flush recommendation when the consumed storage capacity is greater than the capacity threshold (process block 226) and maintaining data storage in the current memory level when the consumed storage capacity is not greater than the capacity threshold (process block 228).

Although described in a particular order, which represents a particular embodiment, it should be noted that the process 218 may be performed in any suitable order. Additionally, embodiments of the process 218 may omit process blocks and/or include additional process blocks. Moreover, in some embodiments, the process 218 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26A and/or processor-side memory controller 26B) may determine one or more storage recommendation including a recommended memory level 96 at which to store a data block 56 and flush (e.g., replace) recommendation for the recommended memory level 96 (process block 220). As described above, in some embodiments, a memory controller 26 may determine one or more storage recommendations based at least in part on a storage recommendation parameter 84 output from a machine learning block 32. Additionally, the memory controller 26 may instruct the memory sub-system 14 to adjust data storage such that the data block 56 is currently stored in the recommended memory level 96.

The memory controller 26 may then determine whether storing the data block 56 in the current memory level results in storage capacity of the current memory level 96 consumed by valid data exceeding a capacity threshold (decision block 224). In some embodiments, the capacity threshold may be set to reduce likelihood of oversubscribing the current memory level 96 and, thus, set less than the full (e.g., maximum) storage capacity of the current memory level 96. For example, the capacity threshold may be set such that, before it is reached, available (e.g., free) storage capacity in the current memory level 96 is sufficient to store a specific number (e.g., one or more) of data blocks 56 or data objects 52. In fact, in some embodiments, the capacity threshold associated with different hierarchical memory levels 96 may differ, for example, to account for differences in storage capacity. As an illustrative example, the capacity threshold associated with a memory level 96 may be set as a percentage of total storage capacity provided by the memory level 96.

In any case, when storage capacity of the current memory level consumed by valid data is greater than the capacity threshold, the memory controller 26 may instruct the memory sub-system 14 to implement the flush recommendation (process block 226). In some embodiments, the flush recommendation may indicate one or more data blocks 56 currently stored in the current memory level 96 that are not expected to be targeted within a duration threshold corresponding with the current memory level 96. In other words, when consumed storage capacity of the current memory level is greater than the corresponding capacity threshold, the memory controller 26 may instruct the memory sub-system 14 to flush the one or more data blocks 56 not expected to targeted within the duration threshold from the current memory level 96.

However, as described above, at least in some instances, a memory level 96 may be unable to simultaneously (e.g., concurrently) read and write data. Thus, at least in such instances, implementing a flush recommendation may delay when data can be read from and/or written to the current memory level 96. Moreover, at least in some instances, implementing the flush recommendation may consume electrical power. Accordingly, when storage capacity of the current memory level consumed by valid data is not greater than the capacity threshold, the memory controller 26 may instruct the memory sub-system 14 to maintain data storage at the current memory level 96, which, at least in some instances, may facilitate improving subsequent data retrieval latency and/or operational efficiency of the memory sub-system 14 and, thus, operational efficiency of a computing system 10 in which the memory sub-system 14 is implemented.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising:
 a processing system comprising processing circuitry and one or more registers; and
 a memory system communicatively coupled to the processing system via one or more communication buses and configured to provide data storage via a plurality of hierarchical memory levels, wherein the memory system comprises:
  a first one or more caches configured to implement a first memory level of the plurality of hierarchical memory levels;
  a first memory array configured to implement a second memory level of the plurality of hierarchical memory levels higher than the first memory level; and
  one or more memory controllers configured to:
   determine a predicted data access pattern expected to occur during an upcoming control horizon based at least in part on first context of first data to be stored in the memory system, second context of second data previously stored in the memory system, or both; and
   control what one or more memory levels of the plurality of hierarchical memory levels implemented in the memory system in which to store the first data, the second data, or both based at least in part on the predicted data access pattern wherein:
    the processing system is configured to output the first data to be stored in the memory system and a write memory access request that indicates the first context of the first data; and
    in response to receipt of the write memory access request, the one or more memory controllers are configured to:
     determine the predicted data access pattern at least in part by determining a next predicted target time of the first data based at least in part on the first context of the first data indicated in the write memory access request, the second context of the second data previously stored in the memory system, or both; and
     control what one or more memory levels in which to store the first data at least in part by instructing the memory system to store the first data in the first memory level implemented using the first one or more caches when a duration between a current time and the next predicted target time of the first data is less than a first duration threshold associated with the first memory level.

2. The apparatus of claim 1, wherein:
 the memory system comprises an intermediate memory level higher than the first memory level and lower than the second memory level; and
 in response to receipt of the write memory access request, the one or more memory controllers are configured to:
  determine whether the duration between the current time and the next predicted target time of the first data is less than an intermediate duration threshold associated with the intermediate memory level when the duration is not less than the first duration threshold associated with the first memory level; and
  control what one or more memory levels in which to store the first data at least in part by:
   instructing the memory system to store the first data in the intermediate memory level when the duration between the current time and the next predicted target time of the first data is less than the intermediate duration threshold associated with the intermediate memory level; and
   instructing the memory system to store the first data in the second memory level implemented using the first memory array when the duration between the current time and the next predicted target time of the first data is not less than the intermediate duration threshold associated with the intermediate memory level.

3. An apparatus comprising:
 a processing system comprising processing circuitry and one or more registers; and
 a memory system communicatively coupled to the processing system via one or more communication buses and configured to provide data storage via a plurality of hierarchical memory levels, wherein the memory system comprises:
  a first one or more caches configured to implement a first memory level of the plurality of hierarchical memory levels;
  a first memory array configured to implement a second memory level of the plurality of hierarchical memory levels higher than the first memory level; and
  one or more memory controllers configured to:
   determine a predicted data access pattern expected to occur during an upcoming control horizon based at least in part on first context of first data to be stored in the memory system, second context of second data previously stored in the memory system, or both; and control what one or more memory levels of the plurality of hierarchical memory levels implemented in the memory system in which to store the first data, the second data, or both based at least in part on the predicted data access pattern, wherein:

the processing system is configured to output a read memory access request indicating the second context of the second data and read access parameters when the processing circuitry targets the second data and the second data results in a register miss; and in response to receipt of the read memory access request, the one or more memory controllers are configured to:
locate and output the second data to the processing system based at least in part on the read access parameters indicated in the read memory access request;
update data access information associated with the second data; and
determine the predicted data access pattern based at least in part on the second context of the second data indicated in the read memory access request, third context of third data previously stored in the memory system, the data access information, or any combination thereof.

4. The apparatus of claim 3, wherein the one or more memory controllers are configured to:
determine the predicted data access pattern at least in part by determining a next predicted target time of the second data targeted by the read memory access request based at least in part on the second context of the second data indicated in the read memory access request, the third context of the third data previously stored in the memory system, the data access information, or any combination thereof;
determine whether a duration between a current time and the next predicted target time of the second data is less than a current duration threshold associated with a current memory level in which the second data is stored in the memory system;
determine whether the duration between the current time and the next predicted target time of the second data is less than a lower duration threshold associated with the first memory level when the duration is less than the current duration threshold associated with the current memory level and the current memory level is not a lowest memory level of the plurality of hierarchical memory levels implemented in the memory system;
determine whether the duration between the current time and the next predicted target time of the second data is less than a higher duration threshold associated with the second memory level when the duration is not less than the current duration threshold associated with the current memory level and the current memory level is not a highest memory level of the plurality of hierarchical memory levels implemented in the memory system; and
control what one or more memory levels in which to store the second data at least in part by:
instructing the memory system to copy an instance of the second data from the current memory level into the first memory level implemented by the first one or more caches when the duration between the current time and the next predicted target time of the second data is less than the lower duration threshold associated with the first memory level;
instructing the memory system to copy the instance of the second data from the current memory into the second memory level implemented by the first memory array when the duration between the current time and the next predicted target time of the second data is less than the higher duration threshold associated with the second memory level and not less than the current duration threshold associated with the current memory level; and
instructing the memory system to maintain storage of the second data in the current memory level when the duration between the current time and the next predicted target time of the second data is less than the current duration threshold associated with the current memory level and not less than the lower duration threshold associated with the first memory level.

5. The apparatus of claim 3, wherein the one or more memory controllers are configured to:
determine a data object previously stored in the first memory array, wherein the data object comprises the third data and context metadata that indicates the third context of the third data;
determine the predicted data access pattern at least in part by determining a next predicted target time of the third data previously stored in the memory system based at least in part on the second context of the second data indicated in the read memory access request, the third context of the third data indicated in the data object, the data access information, or any combination thereof;
determine whether a duration between a current time and the next predicted target time of the third data is less than a current duration threshold associated with a current memory level in which the third data is stored in the memory system;
determine whether the duration between the current time and the next predicted target time of the third data is less than a lower duration threshold associated with the first memory level when the duration is less than the current duration threshold and the current memory level is not a lowest memory level of the plurality of hierarchical memory levels implemented in the memory system;
determine whether the duration between the current time and the next predicted target time of the third data is less than a higher duration threshold associated with the second memory level when the duration is not less than the current duration threshold and the current memory level is not a highest memory level of the plurality of hierarchical memory levels implemented in the memory system; and
control what one or more memory levels in which to store the third data at least in part by:
instructing the memory system to copy an instance of the third data from the current memory level into the first memory level implemented by the first one or more caches when the duration between the current time and the next predicted target time of the third data is less than the lower duration threshold associated with the first memory level;
instructing the memory system to copy the instance of the third data from the current memory level into the second memory level implemented by the first memory array when the duration between the current time and the next predicted target time of the third data is less than the higher duration threshold associated with the second memory level and not less than the current duration threshold associated with the current memory level; and instructing the memory system to maintain storage of the third data in the current memory level when the duration between the current time and the next predicted target time of the third data is less than the current duration threshold associated with the current memory level and not less than the lower duration threshold associated with the first memory level.

6. The apparatus of claim 1, wherein the one or more memory controllers comprise a machine learning block configured to determine output parameters indicative of the predicted data access pattern expected to occur during the upcoming control horizon based at least in part on input parameters indicative of one or more previous data access patterns.

7. An apparatus comprising:
a processing system comprising processing circuitry and one or more registers; and
a memory system communicatively coupled to the processing system via one or more communication buses and configured to provide data storage via a plurality of hierarchical memory levels, wherein the memory system comprises:
a first one or more caches configured to implement a first memory level of the plurality of hierarchical memory levels;
a first memory array configured to implement a second memory level of the plurality of hierarchical memory levels higher than the first memory level; and
one or more memory controllers configured to:
determine a predicted data access pattern expected to occur during an upcoming control horizon based at least in part on first context of first data to be stored in the memory system, second context of second data previously stored in the memory system, or both; and
control what one or more memory levels of the plurality of hierarchical memory levels implemented in the memory system in which to store the first data, the second data, or both based at least in part on the predicted data access pattern;
wherein the one or more memory controllers comprise a machine learning block configured to determine output parameters indicative of the predicted data access pattern expected to occur during the upcoming control horizon based at least in part on input parameters indicative of one or more previous data access patterns, wherein:
the machine learning block comprises a neural network;
the output parameters comprise a first predicted next target time of the first data, a second predicted next target time of the second data, a prediction of next target data, or any combination thereof; and
the input parameters comprise a first block identifier identifying the first data, a second block identifier identifying the second data, the first context of the first data, the second context of the second data, data access information associated with the first data, data access information associated with the second data, a prediction error between a previously predicted data access pattern and a corresponding actual data access pattern, or any combination thereof.

8. An apparatus comprising:
a processing system comprising processing circuitry and one or more registers; and
a memory system communicatively coupled to the processing system via one or more communication buses and configured to provide data storage via a plurality of hierarchical memory levels, wherein the memory system comprises:
a first one or more caches configured to implement a first memory level of the plurality of hierarchical memory levels;
a first memory array configured to implement a second memory level of the plurality of hierarchical memory levels higher than the first memory level; and
one or more memory controllers configured to:
determine a predicted data access pattern expected to occur during an upcoming control horizon based at least in part on first context of first data to be stored in the memory system, second context of second data previously stored in the memory system, or both; and
control what one or more memory levels of the plurality of hierarchical memory levels implemented in the memory system in which to store the first data, the second data, or both based at least in part on the predicted data access pattern,
wherein the memory system comprises a first portion coupled on a processor-side of a memory bus, wherein the first portion of the memory system comprises:
the first one or more caches configured to implement the first memory level of the plurality of hierarchical memory levels;
a second one or more caches configured to implement a first intermediate memory level higher than the first memory level and lower than the second memory level implemented by the first memory array; and
a first memory controller configured to predictively control data storage in the first portion of the memory system at least in part by controlling whether data is stored in the first memory level implemented by the first one or more caches, the first intermediate memory level implemented by the second one or more caches, or both.

9. The apparatus of claim 8, wherein:
the first portion of the memory system comprises a third one or more caches configured to implement a second intermediate memory level higher than the first intermediate memory level and lower than the second memory level implemented by the first memory array; and
the first memory controller configured to predictively control data storage in the first portion of the memory system at least in part by controlling whether data is stored in the first memory level implemented by the first one or more caches, the first intermediate memory level implemented by the second one or more caches, the second intermediate memory level implemented by the third one or more caches, or any combination thereof.

10. The apparatus of claim 8, wherein the memory system comprises a second portion coupled on a memory-side of the memory bus, wherein the second portion of the memory system comprises:

the first memory array configured to implement the second memory level of the plurality of hierarchical memory levels;
a second memory array configured to implement a second intermediate memory level higher than the first intermediate memory level implemented in the first portion of the memory system and lower than the second memory level implemented by the first memory array; and
a second memory controller configured to predictively control data storage in the second portion of the memory system at least in part by controlling whether data is stored in the second memory level implemented by the first memory array, the second intermediate memory level implemented by the second memory array, or both.

11. The apparatus of claim 10, wherein:
the first memory array comprises a non-volatile memory array; and
the second memory array comprises a volatile memory array.

12. The apparatus of claim 10, wherein:
the second portion of the memory system comprises a third one or more caches configured to implement a third intermediate memory level higher than the first intermediate memory level implemented in the first portion of the memory system and lower than second intermediate memory level implemented by the second memory array; and
the second memory controller configured to predictively control data storage in the second portion of the memory system by controlling whether data is stored in the second memory level implemented by the first memory array, the second intermediate memory level implemented by the second memory array, the third intermediate memory level implemented by the third one or more caches, or any combination thereof.

13. The apparatus of claim 12, wherein:
the first one or more caches and the second one or more caches implemented in the first portion of the memory system comprise static random-access memory; and
the third one or more caches implemented in the second portion of the memory system comprise dynamic random-access memory.

14. The apparatus of claim 1, comprising:
a central processing unit, wherein the central processing unit comprises the processing circuitry integrated with the first one or more caches; and
one or more memory devices comprising a plurality of memory cells organized to implement the first memory array.

15. A method for operating a memory system, comprising:
receiving, using one or more memory controllers, a first data block to be stored in the memory system along with a write memory access request that indicates a first one or more context identifiers associated with the first data block;
determining, using the one or more memory controllers, a first predicted next target time of the first data block based at least in part on the first one or more context identifiers associated with the first data block, a second one or more context identifiers associated with a second data block previously stored in the memory system, first data access information associated with the first data block, second data access information associated with the second data block, a first previous prediction error, or any combination thereof;
determining, using the one or more memory controllers, whether a duration between a current time and the first next predicted target time of the first data block is less than a first intermediate duration threshold associated with a first intermediate memory level implemented in a processor-side of the memory system;
instructing, using the one or more memory controllers, the memory system to store an instance of the first data block in one or more memory levels implemented in the processor-side of the memory system when the duration between the current time and the first next predicted target time of the first data block is less than the first intermediate duration threshold associated with the first intermediate memory level implemented in the processor-side of the memory system; and
instructing, using the one or more memory controllers, the memory system to store the first data block in a highest memory level implemented in a memory-side of the memory system communicatively coupled to the processor-side of the memory system via a memory bus.

16. The method of claim 15, wherein instructing the memory system to store the instance of the first data block in the processor-side of the memory system comprises:
determining whether the duration between the current time and the first next predicted target time of the first data block is less than a lowest duration threshold associated with a lowest memory level implemented by a first one or more caches in the processor-side of the memory system;
instructing the memory system to store the instance of the first data block in the lowest memory level implemented by the first one or more caches when the duration between the current time and the first next predicted target time of the first data block is less than the lowest duration threshold associated with the lowest memory level; and
instructing the memory system to store the instance of the first data block in the first intermediate memory level implemented by a second one or more caches in the processor-side of the memory system when the duration between the current time and the first next predicted target time of the first data block is not less than the lowest duration threshold associated with the lowest memory level.

17. The method of claim 16, wherein instructing the memory system to store the instance of the first data block in the processor-side of the memory system comprises:
determining whether the duration between the current time and the first next predicted target time of the first data block is less than a second intermediate duration threshold associated with a second intermediate memory level implemented by a third one or more caches in the processor-side of the memory system, wherein the second intermediate memory level is higher than the lowest memory level and lower than the first intermediate memory level;
instructing the memory system to store the instance of the first data block in the second intermediate memory level implemented by the third one or more caches when the duration between the current time and the first next predicted target time of the first data block is less than the second intermediate duration threshold associated with the second intermediate memory level; and
instructing the memory system to store the instance of the first data block in the first intermediate memory level implemented by the second one or more caches in the processor-side of the memory system when the duration between the current time and the first next predicted target time of the first data block is not less than the second intermediate duration threshold associated with the second intermediate memory level.

18. The method of claim 15, comprising:
  determining, using the one or more memory controllers, whether the duration between the current time and the first next predicted target time of the first data block is less than a second intermediate duration threshold associated with a second intermediate memory level implemented in the memory-side of the memory system when the duration between the current time and the first next predicted target time of the first data block is not less than the first intermediate duration threshold associated with the first intermediate memory level implemented in the processor-side of the memory system, wherein the second intermediate memory level is higher than the first intermediate memory level and lower than the highest memory level; and
  instructing, using the one or more memory controllers, the memory system to store the instance of the first data block in the second intermediate memory level implemented in the processor-side of the memory system when the duration between the current time and the first next predicted target time of the first data block is less than the second intermediate duration threshold associated with the second intermediate memory level.

19. The method of claim 15, wherein determining the first predicted next target time of the first data block comprises:
  inputting to machine learning circuitry a first block identifier identifying the first data block, a second block identifier identifying the second data block, the first one or more context identifiers associated with the first data block, the second one or more context identifiers associated with the second data block, the first data access information associated with the first data block, the second data access information associated with the second data block, the first previous prediction error, or any combination thereof; and
  reading an output of the machine learning circuitry that indicates the first predicted next target time of the first data block.

20. The method of claim 15, wherein instructing, using the one or more memory controllers, the memory system to store the first data block in the highest memory level comprises:
  determining a data object that comprises the first data block and metadata that indicates at least the first one or more context identifiers associated with the first data block; and
  instructing the memory system to store the data object in a memory array used to implement the highest memory level based at least in part on a memory address indicated in the write memory access request.

21. The method of claim 15, comprising:
  receiving, using the one or more memory controllers, a read memory access request targeting the second data block after the first data block is stored in the memory system;
  instructing, using the one or more memory controllers, the memory system to locate and output the second data block based at least in part on read access parameters indicated in the read memory access request;
  updating, using the one or more memory controllers, the second data access information associated with the second data block at least in part by updating an access count parameter associated with the second data block and a last access time parameter associated with the second data block; and
  re-determining, using the one or more memory controllers, the first predicted next target time of the first data block based at least in part on the second data access information associated with the second data block.

22. The method of claim 21, comprising, in response to re-determining the first predicted next target time of the first data block:
  determining, using the one or more memory controllers, whether the duration between the current time and the first predicted next target time of the first data block is less than a current duration threshold associated with a current memory level in which an instance of the first data block is stored in the memory system;
  when the current memory level is not a lowest memory level implemented in the memory system and the duration between the current time and the first predicted next target time of the first data block is less than the current duration threshold:
    determining, using the one or more memory controllers, whether the duration between the current time and the first predicted next target time of the first data block is less than a lower duration threshold associated with a lower memory level implemented in the memory system; and
    instructing, using the one or more memory controllers, the memory system to store the instance of the first data block in the lower memory level when the duration between the current time and the first predicted next target time of the first data block is less than the lower duration threshold associated with the lower memory level; and
  when the current memory level is not a highest memory level implemented in the memory system the duration between the current time and the first predicted next target time of the first data block is not less than the current duration threshold:
    determining, using the one or more memory controllers, whether the duration between the current time and the first predicted next target time of the first data block is less than a higher duration threshold associated with a higher memory level implemented in the memory system; and
    instructing, using the one or more memory controllers, the memory system to store the instance of the first data block in the higher memory level when the duration between the current time and the first predicted next target time of the first data block is less than the higher duration threshold associated with the lower memory level.

23. The method of claim 21, comprising:
  determining, using the one or more memory controllers, a second predicted next target time of the second data block before receipt of the read memory access request based at least in part on the second one or more context identifiers associated with the second data block, second data access information associated with the second data block, a second previous prediction error, or any combination thereof; and
  determining, using the one or more memory controllers, the first previous prediction error based at least in part on difference between the second predicted next target time of the second data block and when the read memory access request actually targeted the second data block.

24. A computing system comprising:
a processing sub-system comprising processing circuitry and one or more registers, wherein the processing sub-system is configured to output a read memory access request targeting a first data block when the processing circuitry targets the first data block and the first data block results in a register miss; and
a memory sub-system communicatively coupled to the to the processing sub-system, wherein the memory sub-system comprises:
a plurality of hierarchical memory layers; and
one or more memory controllers configured to:
instruct the memory sub-system to supply the first data block to the processing sub-system based at least in part on a read access parameter indicated in the read memory access request, a first context identifier of the first data block, or both;
update first data access information associated with the first data block;
determine a predicted data access pattern that indicates that a second data block previously stored in the memory sub-system is expected to be targeted next based at least in part on the first context identifier associated with the first data block, a second context identifier associated with the second data block, and the first data access information associated with the first data block; and
instruct the memory sub-system to copy the second data block from a current memory layer into a lower memory layer when the second data block is expected to be targeted next and the current memory layer is not a lowest memory layer of the plurality of hierarchical memory layers.

25. The computing system of claim 24, wherein:
the memory sub-system is configured to:
store a first data object comprising the first data block and first metadata that indicates first tag metadata that identifies the first data block and the first context identifier associated with the first data block; and
store a second data object comprising the second data block and second metadata that indicates second tag metadata that identifies the second data block and the second context identifier associated with the second data block; and
the one or more memory controllers are configured to:
determine the second context identifier associated with the second data block based at least in part on the second metadata included in the second data object;
determine the first context identifier associated with the first data block based at least in part on the first metadata included in the first data object, the read memory access request, or both; and
locate the first data block in the memory sub-system by successively searching tag metadata associated with valid data stored in the plurality of hierarchical memory layers based at least in part on the first tag metadata that identifies the first data block.

26. The computing system of claim 24, wherein the one or more memory controllers comprise neural network circuitry configured to output a first indication that the second data block is expected to be targeted next when a first block identifier identifying the first data block, a second block identifier identifying the second data block, the first context identifier associated with the first data block, the second context identifier associated with the second data block, the first data access information associated with the first data block, second data access information associated with the second data block, a previous prediction error, or any combination thereof is input.

27. The computing system of claim 26, wherein the neural network circuitry is configured to output a second indication of a predicted next target time of the second data block when the first block identifier identifying the first data block, the second block identifier identifying the second data block, the first context identifier associated with the first data block, the second context identifier associated with the second data block, the first data access information associated with the first data block, the second data access information associated with the second data block, the previous prediction error, or any combination thereof, is input.

28. The computing system of claim 24, wherein, when the processing circuitry targets the first data block and the first data block results in a register miss, the processing sub-system is configured to:
determine an aspect of the computing system that generated the first data block, that is expected to target the first data block, or both;
determine the first context identifier to indicate the aspect of the computing system; and
generate the read memory access request to indicate at least the first context identifier associated with the first data block, a memory address associated with the first data block, size of the first data block, and a read enable bit.

29. The computing system of claim 24, wherein:
before the processing circuitry targets the first data block, the processing sub-system is configured to:
determine an aspect of the computing system that generated the first data block, that is expected to target the first data block, or both;
determine the first context identifier to indicate the aspect of the computing system;
generate a write memory access request to indicate at least the first context identifier associated with the first data block, a memory address associated with the first data block, size of the first data block, and a write enable bit; and
output the first data block along with the write memory access request to the memory sub-system; and
in response to receipt of the write memory access request, the one or more memory controllers are configured to:
determine tag metadata to be used to identify the first data block based at least in part on the memory address indicated in the write memory access request;
determine context metadata that indicates the first context identifier indicated in the write memory access request; and
store a data object that associates the first data block with the tag metadata and the context metadata in one or more memory layers of the plurality of hierarchical memory layers implemented in the memory sub-system.

* * * * *